US 11,455,060 B2

(12) United States Patent
Tsukano

(10) Patent No.: US 11,455,060 B2
(45) Date of Patent: Sep. 27, 2022

(54) DETECTION APPARATUS, DETECTION METHOD, AND NON-TRANSITORY COMPUTER-READABLE MEDIUM

(71) Applicant: YOKOGAWA ELECTRIC CORPORATION, Tokyo (JP)

(72) Inventor: Masahito Tsukano, Musashino (JP)

(73) Assignee: Yokogawa Electric Corporation, Musashino (JP)

( * ) Notice: Subject to any disclaimer, the term of this patent is extended or adjusted under 35 U.S.C. 154(b) by 0 days.

(21) Appl. No.: 17/089,990

(22) Filed: Nov. 5, 2020

(65) Prior Publication Data

US 2021/0141510 A1 May 13, 2021

(30) Foreign Application Priority Data

Nov. 8, 2019 (JP) .............................. JP2019-203343

(51) Int. Cl.
  *G06F 3/041* (2006.01)
  *G06F 3/04845* (2022.01)
  *G06F 3/0488* (2022.01)

(52) U.S. Cl.
  CPC ........ *G06F 3/04186* (2019.05); *G06F 3/0488* (2013.01); *G06F 3/04845* (2013.01)

(58) Field of Classification Search
  CPC .............. G06F 3/04186; G06F 3/04845; G06F 3/0488; G06F 2203/04108; G06F 3/044
  See application file for complete search history.

(56) References Cited

U.S. PATENT DOCUMENTS

| 10,963,098 B1* | 3/2021 | Zoubir ............... G06F 3/04186 |
| 2006/0125801 A1* | 6/2006 | Hsu ......................... G06F 3/044 345/173 |
| 2010/0033423 A1* | 2/2010 | Iio ......................... G06F 3/0445 345/156 |
| 2013/0181943 A1* | 7/2013 | Bulea ..................... G06F 3/041 345/174 |
| 2014/0028575 A1* | 1/2014 | Parivar ............... G06F 3/04883 345/173 |
| 2014/0035861 A1* | 2/2014 | Soo ..................... G06F 3/04883 345/174 |
| 2014/0267142 A1* | 9/2014 | MacDougall ........... G06F 3/005 345/174 |
| 2016/0018891 A1* | 1/2016 | Levesque ............. H05K 999/99 345/174 |
| 2016/0020047 A1* | 1/2016 | Hill ..................... G06Q 30/0283 340/12.5 |

(Continued)

FOREIGN PATENT DOCUMENTS

JP  2010-15204 A    1/2010
JP  2010-244520 A  10/2010
(Continued)

*Primary Examiner* — Ibrahim A Khan
(74) *Attorney, Agent, or Firm* — Sughrue Mion, PLLC

(57) ABSTRACT

A detection apparatus includes a cover, touch sensors that output a detection signal based on contact on the cover, and a controller that acquires the detection signal. The controller detects contact on the cover based on the detection signal and judges whether input of a predetermined pattern is provided based on time variable data of the detection signal outputted by each touch sensor from when the contact on the cover starts until the contact on the cover ends.

20 Claims, 22 Drawing Sheets

(56) References Cited

U.S. PATENT DOCUMENTS

| | | | |
|---|---|---|---|
| 2016/0179241 A1* | 6/2016 | Vandermeijden | G06F 3/044 345/174 |
| 2017/0131840 A1* | 5/2017 | Deichmann | G06F 3/0421 |
| 2020/0315254 A1* | 10/2020 | Zielazek | A24F 40/60 |

FOREIGN PATENT DOCUMENTS

| | | |
|---|---|---|
| JP | 2015-524977 A | 8/2015 |
| JP | 2016-224606 A | 12/2016 |
| WO | 2014/029691 A1 | 2/2014 |
| WO | 2019/122874 A1 | 6/2019 |

\* cited by examiner

DETECTION APPARATUS, DETECTION METHOD, AND NON-TRANSITORY COMPUTER-READABLE MEDIUM

CROSS-REFERENCE TO RELATED APPLICATION

The present application claims priority to and the benefit of Japanese Patent Application No. 2019-203343 filed Nov. 8, 2019, the entire contents of which are incorporated herein by reference.

TECHNICAL FIELD

The present disclosure relates to a detection apparatus, a detection method, and a non-transitory computer-readable medium.

BACKGROUND

An input apparatus that detects contact by a user's finger or the like with a plurality of sensors and detects the contact position based on the detection result of each sensor is known. For example, see patent literature (PTL) 1.

CITATION LIST

Patent Literature

PTL 1: JP 2010-244520 A

SUMMARY

A detection apparatus according to an embodiment includes a cover, a plurality of touch sensors configured to output a detection signal based on contact on the cover, and a controller configured to acquire the detection signal. The controller is configured to detect contact on the cover based on the detection signal, and the controller is configured to judge whether input of a predetermined pattern is provided based on time variable data of the detection signal outputted by each touch sensor from when the contact on the cover starts until the contact on the cover ends.

A detection method according to an embodiment includes acquiring a detection signal based on contact on a cover from a plurality of touch sensors, detecting contact on the cover based on the detection signal, and judging whether input of a predetermined pattern is provided based on time variable data of the detection signal outputted by each touch sensor from when the contact on the cover starts until the contact on the cover ends.

A non-transitory computer-readable medium according to an embodiment stores a detection program to be executed by a processor. The detection program causes the processor to acquire a detection signal based on contact on a cover from a plurality of touch sensors, detect contact on the cover based on the detection signal, and judge whether input of a predetermined pattern is provided based on time variable data of the detection signal outputted by each touch sensor from when the contact on the cover starts until the contact on the cover ends.

DETAILED DESCRIPTION

Figure 1:
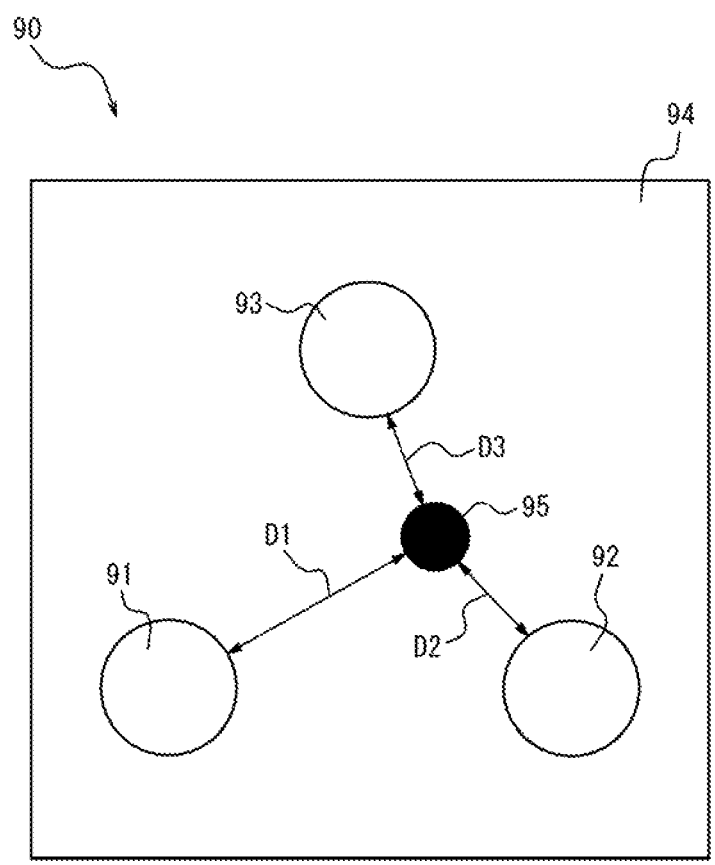
FIG. 1 is a plan view illustrating a configuration of a detection apparatus according to a comparative example.

Erroneous input is more likely to occur if the accuracy with which the sensor detects the contact position decreases. The number of sensors could be increased to reduce erroneous input, but a demand exists for reducing the number of sensors in so far as possible.

It would be helpful to provide a detection apparatus, a detection method, and a non-transitory computer-readable medium capable of reducing erroneous input with few sensors.

A detection apparatus according to an embodiment includes a cover, a plurality of touch sensors configured to output a detection signal based on contact on the cover, and a controller configured to acquire the detection signal. The controller is configured to detect contact on the cover based on the detection signal, and the controller is configured to judge whether input of a predetermined pattern is provided based on time variable data of the detection signal outputted by each touch sensor from when the contact on the cover starts until the contact on the cover ends. When judgment is made in this way based on time variable data of the detection signal, the input pattern is judged without conversion of the detection signal to coordinates of the contact position. Error that occurs during coordinate conversion is avoided by coordinate conversion being omitted. This makes it unnecessary to increase the number of touch sensors for a reduction in the conversion error of coordinates. Consequently, erroneous input can be reduced without an increase in the number of touch sensors.

In the detection apparatus according to an embodiment, the input of the predetermined pattern may include slide input. A pattern of slide input is thereby judged without the need to convert the detection signal to coordinates of the contact position and acquire movement of the coordinates. Consequently, erroneous input is reduced.

Each touch sensor in the detection apparatus according to an embodiment may be configured so that as the distance from the position where the cover is contacted to the touch sensor is shorter, the touch sensor outputs a larger signal as the detection signal. In this way, the magnitude of the signal is determined uniquely in accordance with the distance from the contact position to the touch sensor. The time variable data generated by input is therefore determined uniquely for each pattern. Consequently, erroneous input is reduced.

In the detection apparatus according to an embodiment, the controller may be configured to judge whether the input of the predetermined pattern is to provided based on a trajectory associating a magnitude of the detection signal outputted by each touch sensor with time as a parameter. The pattern of input can easily be judged when judgment is made in this way based on the trajectory. Consequently, erroneous input can be reduced.

In the detection apparatus according to an embodiment, the controller may be configured to judge whether the input of the predetermined pattern is provided based on the degree of similarity between a trajectory acquired in advance by input of the predetermined pattern and a trajectory acquired when input targeted for judgment of provision of the input of the predetermined pattern is provided. The judgment accuracy of the input pattern increases when a comparison is made in this way with a trajectory corresponding to a pattern registered in advance. Consequently, erroneous input can be reduced.

A detection method according to an embodiment includes acquiring a detection signal based on contact on a cover from a plurality of touch sensors, detecting contact on the cover based on the detection signal, and judging whether input of a predetermined pattern is provided based on time variable data of the detection signal outputted by each touch sensor from when the contact on the cover starts until the contact on the cover ends. When judgment is made in this way based on time variable data of the detection signal, the input pattern is judged without conversion of the detection signal to coordinates of the contact position. Error that occurs during coordinate conversion is avoided by coordinate conversion being omitted. This makes it unnecessary to increase the number of touch sensors for a reduction in the conversion error of coordinates. Consequently, erroneous input can be reduced without an increase in the number of touch sensors.

A non-transitory computer-readable medium according to an embodiment stores a detection program to be executed by a processor. The detection program causes the processor to acquire a detection signal based on contact on a cover from a plurality of touch sensors, detect contact on the cover based on the detection signal, and judge whether input of a predetermined pattern is provided based on time variable data of the detection signal outputted by each touch sensor from when the contact on the cover starts until the contact on the cover ends. When judgment is made in this way based on time variable data of the detection signal, the input pattern is judged without conversion of the detection signal to coordinates of the contact position. Error that occurs during coordinate conversion is avoided by coordinate conversion being omitted. This makes it unnecessary to increase the number of touch sensors for a reduction in the conversion error of coordinates. Consequently, erroneous input can be reduced without an increase in the number of touch sensors.

The present disclosure provides a detection apparatus, a detection method, and a non-transitory computer-readable medium capable of reducing erroneous input with few sensors.

Comparative Example

As illustrated in FIG. 1, a detection apparatus 90 according to a comparative example includes touch sensors 91, 92, 93 and a cover 94. The detection apparatus 90 detects a contact position 95 of a contacting object, such as a user's finger, when the contacting object contacts the cover 94. The touch sensor 91 detects a distance D1 to the contact position 95. The touch sensor 92 detects a distance D2 to the contact position 95. The touch sensor 93 detects a distance D3 to the contact position 95. When the touch sensors 91, 92, 93 are not collinear, the detection apparatus 90 can identify the coordinates of the contact position 95 based on the distances D1, D2, D3.

The touch sensors 91, 92, 93 detect the distance to the contact position 95 based on the change in capacitance due to contact by the contacting object. As the cover 94 is thicker, the detection accuracy of the change in capacitance decreases. Consequently, the detection accuracy of the coordinates of the contact position 95 decreases.

Furthermore, the contacting object may slide while in contact with the cover 94. The detection apparatus 90 detects the trajectory of the slide by consecutively detecting the contact position 95 in accordance with movement of the contacting object. When the detection accuracy of the coordinates of the contact position 95 is low, the detection accuracy of the trajectory of the slide decreases. When the trajectory of the slide is associated with a predetermined command, a decrease in the detection accuracy of the trajectory of the slide may lead to erroneous input.

When the detection apparatus 90 is used in a field device, the cover 94 may be thick to ensure chemical resistance. Accordingly, demand exists for an increase in the detection accuracy of the coordinates of the contact position 95 even when the cover 94 is thick. The number of touch sensors could be increased to improve the detection accuracy of the coordinates of the contact position 95. An increase in the number of touch sensors, however, could lead to a decrease in the degree of design freedom of the detection apparatus 90 or to an increased cost of the detection apparatus 90.

The following four steps are performed when the detection apparatus 90 detects a slide.
(1) The detection apparatus 90 calculates the distance from each touch sensor to the contact position 95 based on the detection result of each touch sensor.
(2) The detection apparatus 90 calculates the coordinates of the contact position 95 based on the distance from each touch sensor to the contact position 95.
(3) The detection apparatus 90 acquires the coordinates of the contact position 95 over a predetermined period of time to identify the trajectory over which the coordinates move.
(4) When the identified trajectory matches or is similar to a trajectory registered in advance, the detection apparatus 90 judges that the command associated with the registered trajectory has been inputted.

If the number of steps for detection is large, error accumulates in the processing of each step, and erroneous input may occur. The load on the detection apparatus 90 also increases as the number of steps is larger.

When the detection apparatus 90 is used in a field device, the user may perform operations while wearing a thick glove. The range over which the contacting object contacts the cover 94 widens in this case. The coordinates of the contact position 95 are consequently calculated as a point within a predetermined range. Accordingly, error in the coordinates of the contact position 95 may increase. Furthermore, the area of the cover 94 within the field device is small. In this case, if different commands are allocated to the case of the contact position 95 being included in a certain region and the contact position 95 being included in a different region, it becomes more likely that the user will contact an unintended region, causing an unintended command to be executed. Demand exists for a reduction in erroneous input even when the contact range is wide.

As described above, the number of touch sensors in the detection apparatus 90 according to the comparative example could be increased to decrease erroneous input even if the cover 94 is thick. Increasing the number of touch sensors, however, also has disadvantages. Demand exists for decreasing erroneous input without increasing the number of touch sensors. Simple detection of slide operations is also desired.

The present disclosure therefore describes a detection apparatus and a detection method capable of reducing erroneous input with few sensors and capable of easily detecting slide operations.

Embodiment of Present Disclosure

Figure 2A:
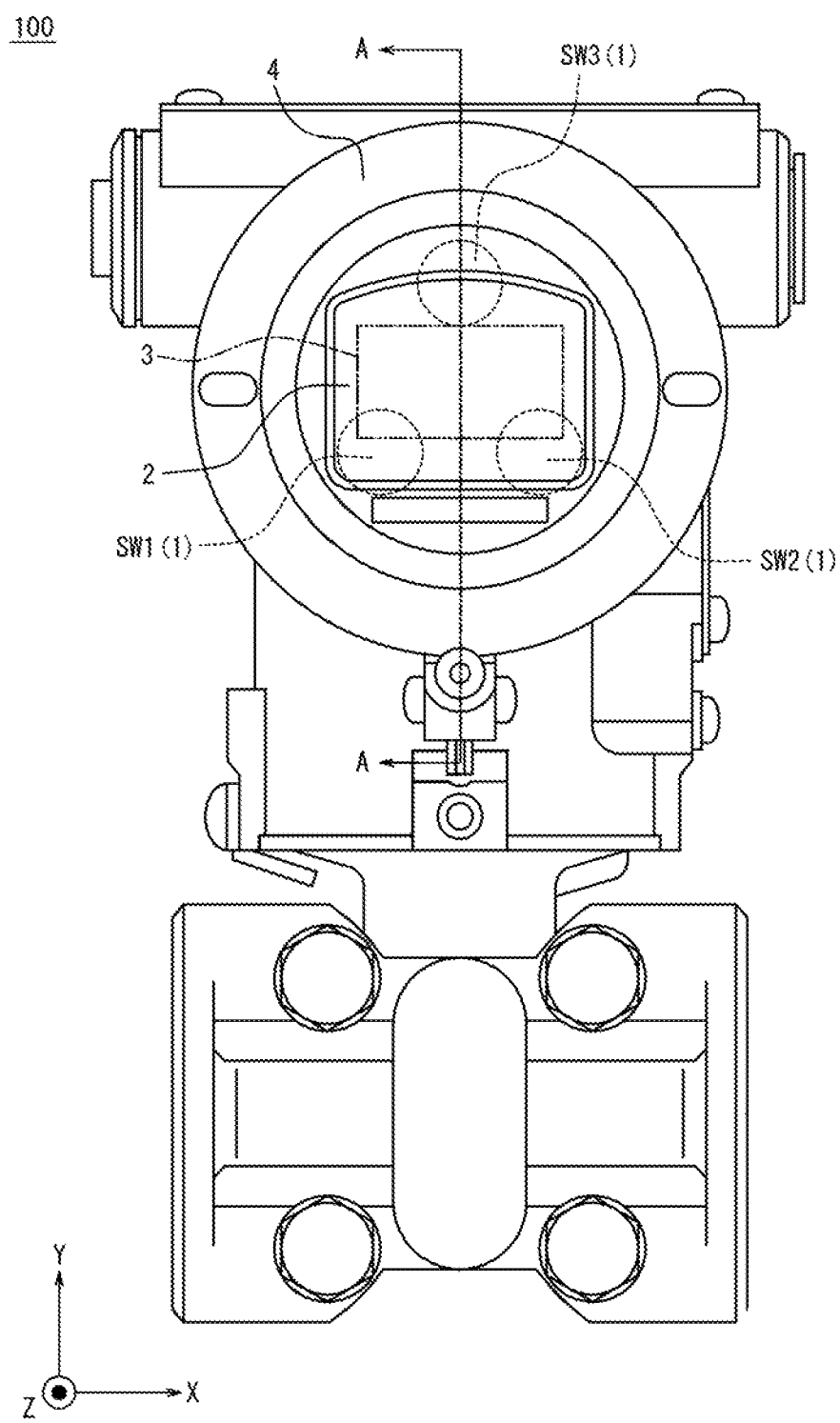
FIG. 2A is a plan view illustrating an example configuration of a field device that includes a detection apparatus according to an embodiment of the present disclosure.
Figure 2B:
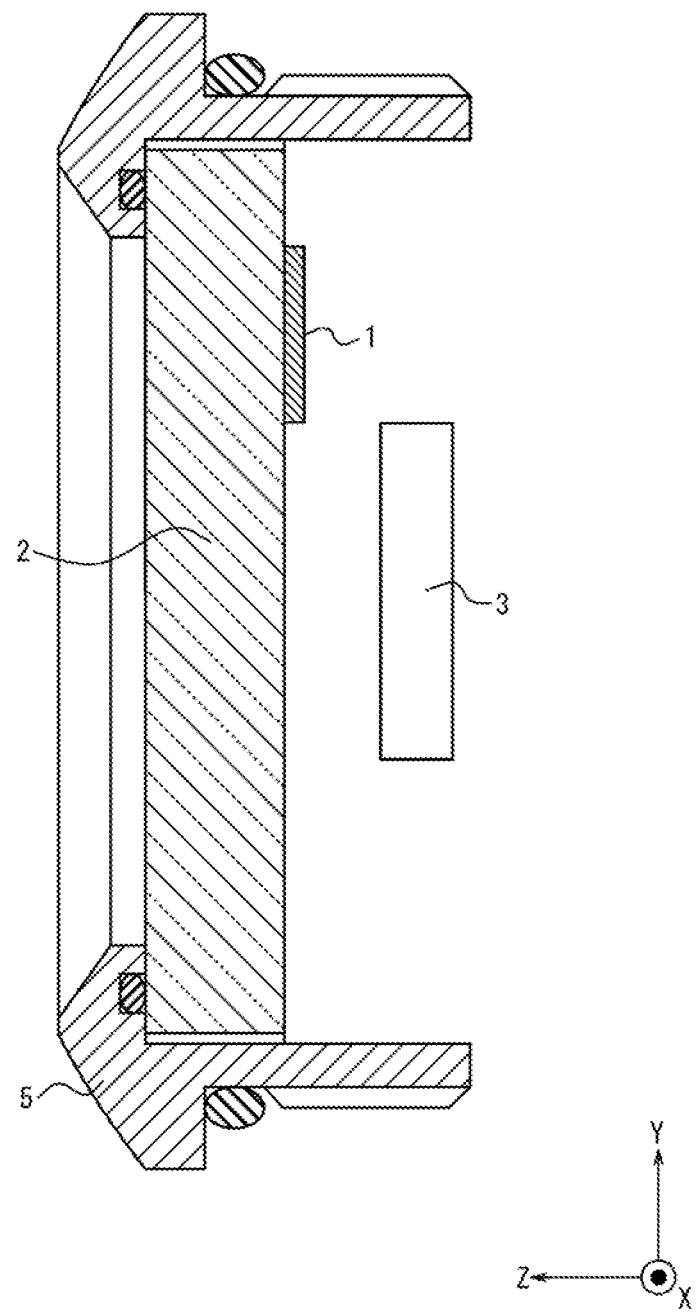
FIG. 2B is a cross-section along the A-A line in FIG. 2A.

As illustrated in FIGS. 2A and 2B, a field device 100 according to an embodiment includes touch sensors 1, a cover 2, a display 3, and a housing 5. The housing 3 houses the touch sensors 1, the cover 2, and the display 3. The cover 2 is positioned in front of the touch sensors 1 and the display 3 and protects the touch sensors 1 and the display 3.

The touch sensors 1 include transparent electrodes located on the back surface of the cover 2. The touch sensors detect the capacitance between the front surface of the cover 2 and the transparent electrodes. When a contacting object, such as the user's finger or stylus, contacts the surface of the cover 2, the capacitance between the contacting object in contact with the surface of the cover 2 and the transparent electrodes increases. The touch sensors 1 can detect contact by the contacting object on the surface of the cover 2 by detecting the increase in capacitance. The touch sensors 1 are configured to detect a larger capacitance as the position contacted by the contacting object is closer. In other words, the touch sensors 1 detect an increase in capacitance as the contact position approaches the touch sensors 1. The touch sensors 1 detect a decrease in capacitance as the contact position moves away from the touch sensors 1. In other words, the capacitance detected by the touch sensors 1 is uniquely determined in accordance with the distance from the position contacted by the contacting object to the touch sensors 1.

The cover 2 is configured by a transparent member so that the content displayed on the display 3 is visible to the user on the surface side. The cover 2 is configured in accordance with the environment in which the field device 100 is to be installed. The cover 2 may, for example, be made of a highly pressure resistant material or a material with chemical resistance. The cover 2 may, for example, include glass, resin, or the like.

The display 3 may include a liquid crystal panel, for example. The display 3 is not limited to a liquid crystal panel and may include any of a variety of display devices. The housing 5 may, for example, be made of a material such as resin.

Figure 3:
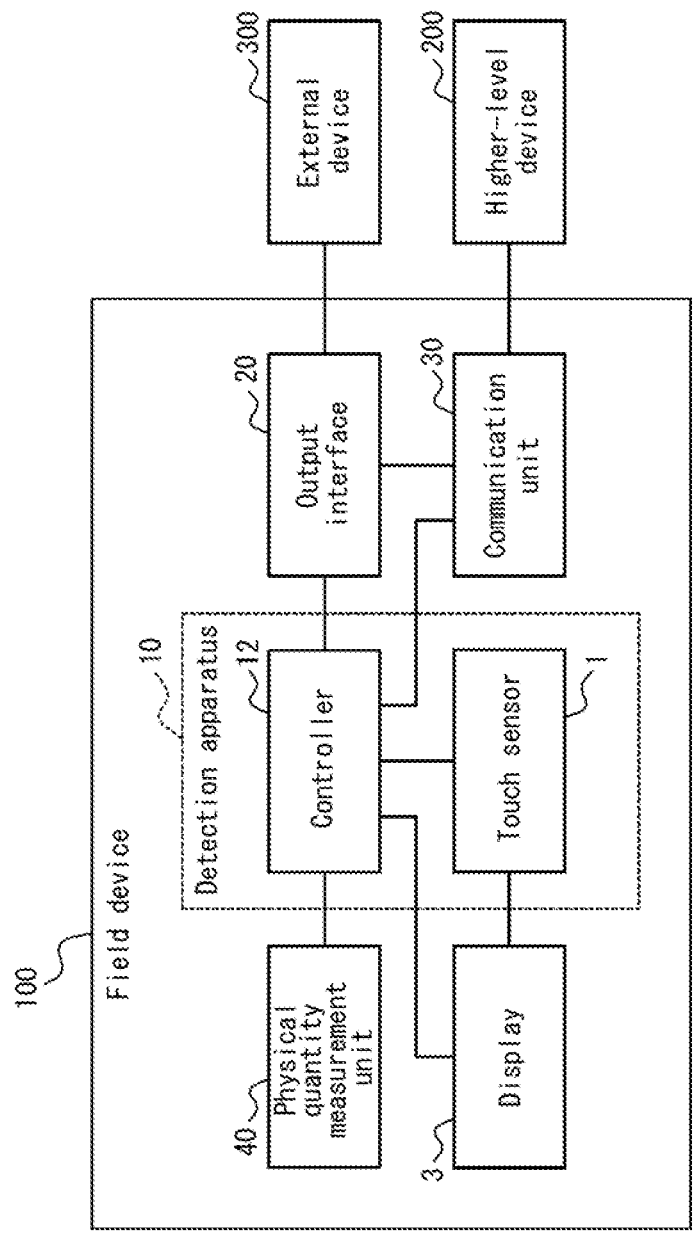
FIG. 3 is a block diagram illustrating an example configuration of a field device that includes a detection apparatus according to an embodiment of the present disclosure.

As illustrated in FIG. 3, the field device 100 further includes a controller 12, an output interface 20, a communication unit 30, and a physical quantity measurement unit 40. The configuration including the touch sensors 1 and the controller 12 is also referred to as a detection apparatus 10. In other words, the field device 100 further includes the detection apparatus 10. The touch sensors 1 may be connected to the controller 12 via an A/D converter. The physical quantity measurement unit 40 may be connected to the controller 12 via an A/D converter. The A/D converter may convert an analog signal outputted by the touch sensors 1 or the physical quantity measurement unit 40 to a digital signal and output the digital signal to the controller 12.

The controller 12 acquires information from the components of the field device 100 or the detection apparatus 10 and controls the components. The controller 12 may be configured by a processor such as a central processing unit (CPU). The controller 12 may implement the various functions of the field device 100 or the detection apparatus 10 by executing a predetermined program.

The controller 12 may include a memory. The memory may store various information used for operations of the controller 12, programs for implementing the functions of the controller 12, and the like. The memory may function as a working memory of the controller 12. The memory may, for example, be a semiconductor memory. The memory may be configured separately from the controller 12.

The controller 12 acquires the measurement result from the physical quantity measurement unit 40. To notify an external device 300 of the measurement result, the controller 12 may cause the output interface 20 to generate a current signal based on the measurement result and output the current signal to the external device 300. The controller 12 outputs control information for outputting the current signal to the output interface 20. The output interface 20 generates the current signal based on the control information from the controller 12 and outputs the current signal to the external device 300. The external device 300 can acquire the measurement result based on the current signal. The external device 300 may be a monitor device for monitoring the measurement result. The output interface 20 and the external device 300 may be connected by a four-wire system or a two-wire system.

The signal that the field device 100 uses for notifying the external device 300 of the measurement result is also referred to as an instrumentation reference signal. The instrumentation reference signal includes a current with a magnitude of at least 4 mA and no more than 20 mA, for example. In other words, the instrumentation reference signal is a current signal having a current whose magnitude is controlled within a predetermined range. The field device 100 may, for example, be a differential pressure transmitter. The field device 100 is not limited to being a differential pressure transmitter and may be any of various other apparatuses.

The communication unit 30 is connected to the controller 12 and the output interface 20. The communication unit 30 connects to a higher-level device 200 that manages the field device 100. The higher-level device 200 may, for example, be a device configuring a distributed control system (DCS). The communication unit 30 transmits and receives data between i) the controller 12 and output interface 20 and ii) the higher-level device 200. The field device 100 may, for example, transmit data related to the measurement result of the physical quantity measurement unit 40 to the higher-level device 200. The communication unit 30 may include a communication interface for a local area network (LAN) or the like. The communication interface may communicably connect to the higher-level device 200 in a wired or wireless manner. The communication unit 30 is not limited to connecting to the higher-level device 200 and may communicably connect to any of various other devices.

The physical quantity measurement unit 40 may, for example, include a differential pressure sensor, a pressure sensor, or the like. The physical quantity measurement unit 40 may include a temperature sensor, a flow sensor, a pH sensor, or the like. The physical quantity measurement unit 40 is not limited to these examples and may include sensors that measure various other physical quantities.

The field device 100 converts the measurement result of the physical quantity measurement unit 40 into data acquirable by the external device 300 and outputs the data. The controller 12 converts the measurement result into data by performing calculations on the measurement result. The controller 12 may convert the measurement result into data based on parameters. The parameters may include information designating units for converting the measurement result. The parameters may include information associating the upper limit and lower limit of the measurement result with the upper limit and lower limit of data to be outputted.

The field device 100 provides the function of a human machine interface (HMI) using the detection apparatus 10 so that the user can set the parameters. Field devices are sometimes set by opening the case of the device and connecting an external setting device with wiring. By contrast, the HMI function can be used to set parameters in the field device 100 according to the present embodiment. Such a method of operating the field device 100 to set parameters is also referred to as local parameter setting (LPS).

The field device 100 causes the display 3 to display a menu for setting parameters, the content of the set parameters, the measurement result converted based on the parameters, and the like. The field device 100 uses the touch sensors 1 to detect operations such as a touch on the cover 2 with a contacting object such as the user's finger or stylus, a slide of the contacting object touching the cover 2, and the like. The field device 100 interprets the operation detected by the touch sensors 1 as a command inputted by the user. Based on the inputted command, the field device 100 changes the content displayed on the display 3 and changes the settings of the parameters.

Operation Example of Detection Apparatus

As described above, the controller 12 controls the detection apparatus 10. The controller 12 acquires a detection signal from the touch sensors 1 and interprets a touch, slide, etc. operation by the user on the surface of the cover 2 as a command inputted by the user.

When the contacting object, such as the user's finger or stylus, contacts the surface of the cover 2, the capacitance detected by the touch sensor 1 increases as the distance from the touch sensor 1 to the contact position of the contacting object on the surface of the cover 2 is shorter. The touch sensor 1 outputs a detection signal based on the detected capacitance. The controller 12 acquires the detection signal outputted by the touch sensors 1 as the output of the touch sensors 1. As described above, the capacitance detected by the touch sensors 1 is uniquely determined in accordance with the distance from the contact position to the touch sensors 1. Accordingly, the magnitude of the output of the touch sensors 1 is determined uniquely in accordance with the distance from the contact position to the touch sensors 1.

The touch sensors 1 may be configured to output a detection signal representing zero when no object is contacting the surface of the cover 2. In other words, the touch sensors 1 may be configured to be capable of offsetting the magnitude of the detection signal. The controller 12 may offset the detection signal outputted by the touch sensors 1. For example, the controller 12 may acquire the detection signal outputted by the touch sensors 1 when no object is contacting the surface of the cover 2 as an offset signal and subtract the offset signal from the detection signal.

As illustrated in FIG. 2A, the touch sensors 1 include a touch sensor SW1, a touch sensor SW2, and a touch sensor SW3. The number of touch sensors 1 is not limited to three. The number may be two, or the number may be four or more. When no distinction need be made, the touch sensors SW1, SW2, and SW3 are represented below as a plurality of touch sensors 1. The controller 12 acquires the output from each touch sensor 1. The controller 12 need not detect the coordinates of the contact position based on the output of each touch sensor 1.

The controller 12 acquires the output from each touch sensor 1 continuously or at discrete times. When the controller 12 acquires the output of each touch sensor 1 at discrete times, the controller 12 may acquire the output over a predetermined sampling period or acquire the output at irregular intervals. The controller 12 associates the output of each touch sensor 1 with time as a parameter and identifies one trajectory traced in a virtual space that has the axes corresponding to the output of each touch sensor 1 as a basis. When the controller 12 acquires the output from the touch sensors SW1, SW2, and SW3, the output of the touch sensors SW1, SW2, and SW3 over a predetermined period of time is associated with time as a parameter for representation as a trajectory in a virtual three-dimensional space. When the number of touch sensors 1 is N (where N is a natural number), the output of each touch sensor 1 over a predetermined period of time is associated with time as a parameter for representation as a trajectory in a virtual N-dimensional space.

<Top to Bottom Slide>

Figure 4A:
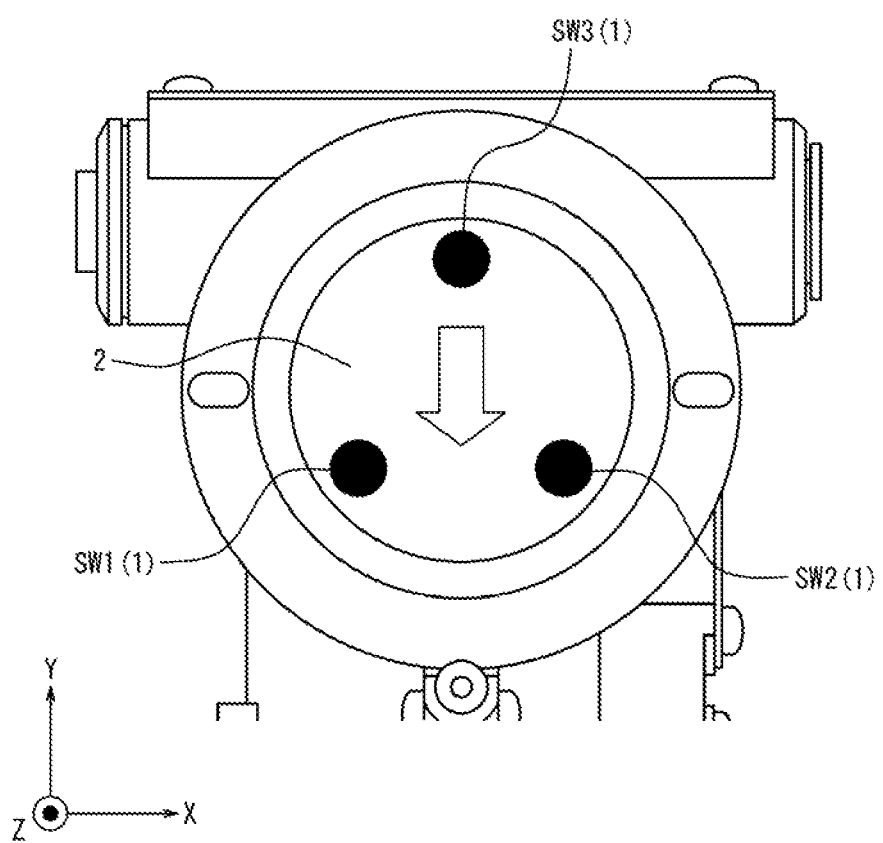
FIG. 4A illustrates movement for slide input in the negative direction of the y-axis.
Figure 4B:
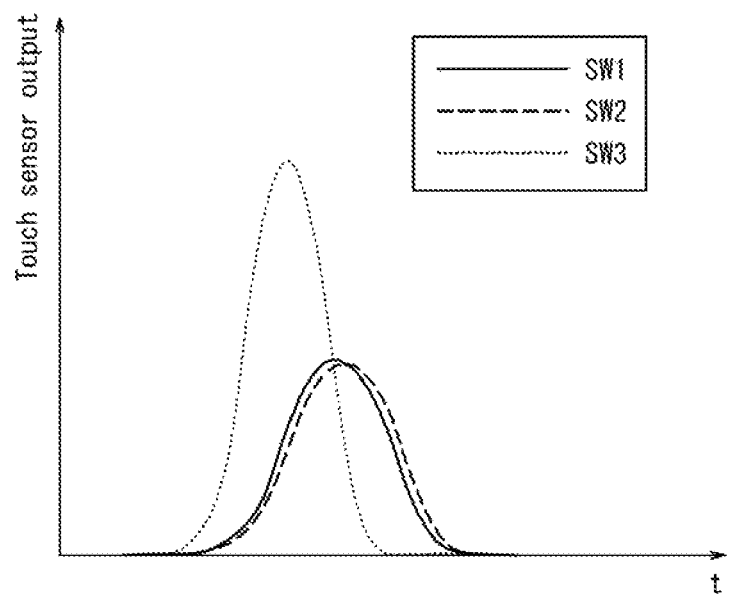
FIG. 4B is a graph illustrating the change in the output of each touch sensor due to the slide input illustrated in FIG. 4A.

FIG. 4A illustrates the case of the contacting object sliding on the surface of the cover 2 in the negative direction of the y-axis, as indicated by the arrow. In this case, the output of the touch sensors SW1, SW2, SW3 is illustrated in the graph of FIG. 4B. The horizontal axis in the graph of FIG. 4B represents the passage of time (t). The vertical axis represents the output of each touch sensor 1. First, the output of the touch sensor SW3 located on the side of the positive direction of the y-axis (upper side) increases. Next, the output of the touch sensors SW1 and SW2 located on the side of the negative direction of the y-axis (lower side) increases.

Figure 4C:
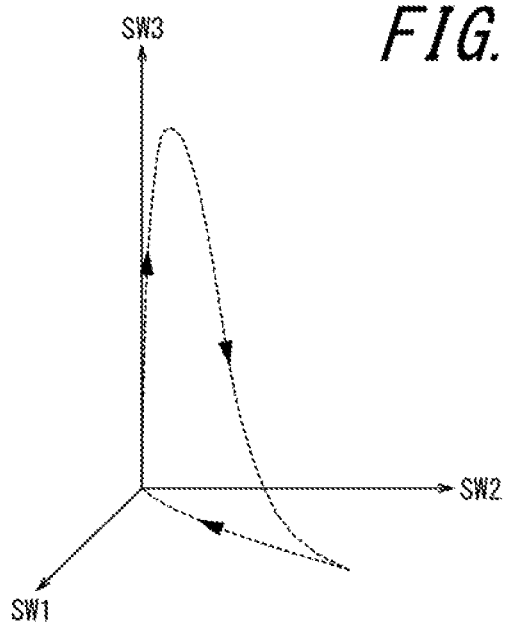
FIG. 4C is a graph illustrating a trajectory based on the output of each touch sensor illustrated in FIG. 4B.

The output of each touch sensor 1 illustrated in FIG. 4B is associated with time as a parameter to be represented as the trajectory illustrated in FIG. 4C. In FIG. 4C, the three orthogonal axes SW1, SW2, SW3 constitute the basis of a three-dimensional space and respectively represent the output of the touch sensors SW1, SW2, SW3. The trajectory represented in FIG. 4C departs from the origin and proceeds in the direction of increasing output of the touch sensor SW3. Next, while the output of the touch sensor SW3 decreases, the trajectory proceeds in the direction of increasing output of the touch sensors SW1 and SW2. The trajectory then proceeds in the direction of decreasing output of the touch sensors SW1 and SW2 and returns to the origin.

When the user provides slide input, the controller 12 acquires the output of each touch sensor 1 and generates the trajectory. The controller 12 may judge that input sliding on the surface of the cover 2 in the negative direction of the y-axis has been provided when the trajectory matches or is similar to the trajectory illustrated in FIG. 4C.

<Bottom to Top Slide>

Figure 5A:
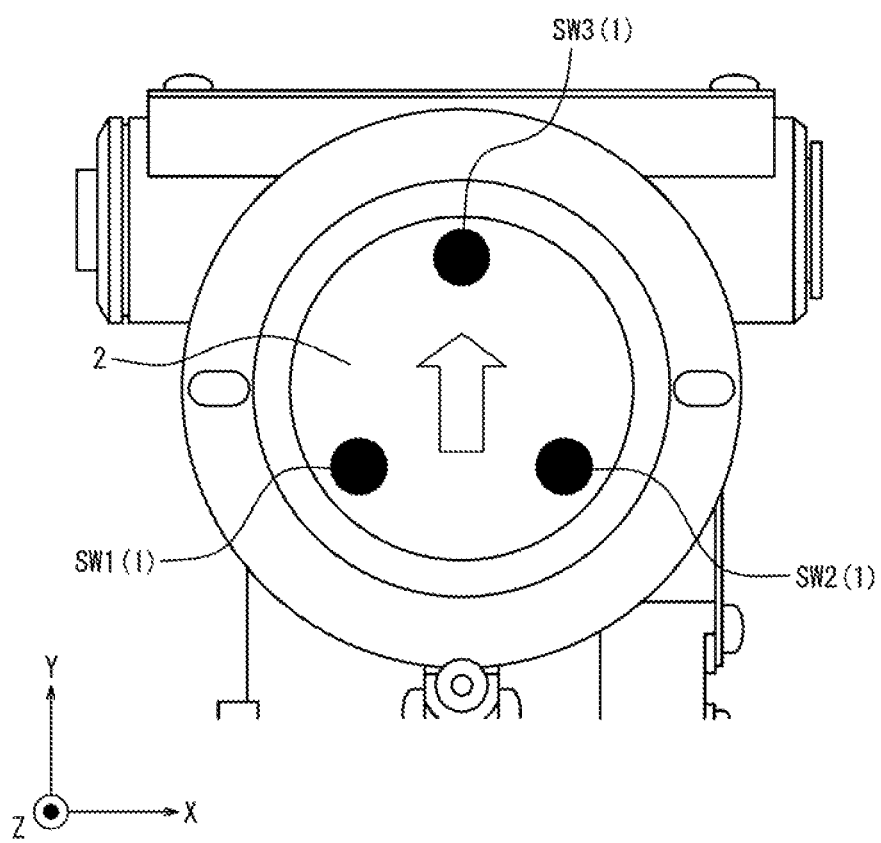
FIG. 5A illustrates movement for slide input in the positive direction of the y-axis.
Figure 5B:
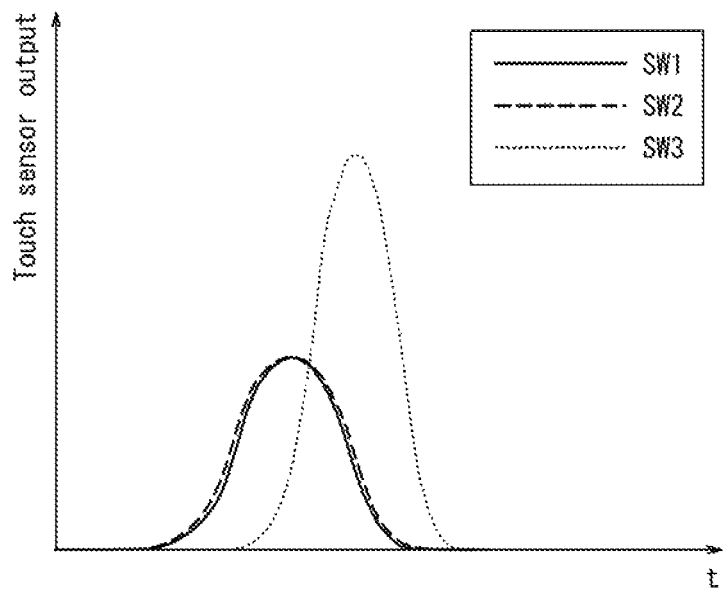
FIG. 5B is a graph illustrating the change in the output of each touch sensor due to the slide input illustrated in FIG. 5A.

FIG. 5A illustrates the case of the contacting object sliding on the surface of the cover 2 in the positive direction of the y-axis, as indicated by the arrow. In this case, the output of the touch sensors SW1, SW2, SW3 is illustrated in the graph of FIG. 5B. The horizontal axis in the graph of FIG. 5B represents the passage of time (t). The vertical axis represents the output of each touch sensor 1. First, the output of the touch sensors SW1 and SW2 located on the side of the negative direction of the y-axis (lower side) increases. Next, the output of the touch sensor SW3 located on the side of the positive direction of the y-axis (upper side) increases.

Figure 5C:
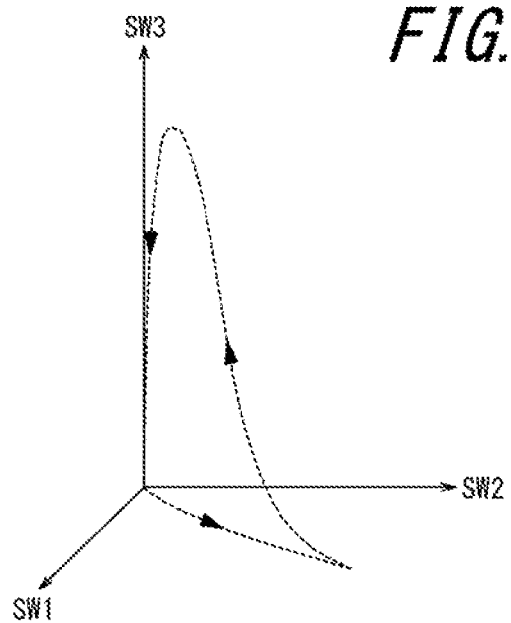
FIG. 5C is a graph illustrating a trajectory based on the output of each touch sensor illustrated in FIG. 5B.

The output of each touch sensor 1 illustrated in FIG. 5B is associated with time as a parameter to be represented as the trajectory illustrated in FIG. 5C. In FIG. 5C, the three orthogonal axes SW1, SW2, SW3 constitute the basis of a three-dimensional space and respectively represent the output of the touch sensors SW1, SW2, SW3. The trajectory represented in FIG. 5C departs from the origin and proceeds in the direction of increasing output of the touch sensors SW1 and SW2. Next, while the output of the touch sensors SW1 and SW2 decreases, the trajectory proceeds in the direction of increasing output of the touch sensor SW3. The trajectory then proceeds in the direction of decreasing output of the touch sensor SW3 and returns to the origin.

When the user provides slide input, the controller 12 acquires the output of each touch sensor 1 and generates the trajectory. The controller 12 may judge that input sliding on the surface of the cover 2 in the positive direction of the y-axis has been provided when the trajectory matches or is similar to the trajectory illustrated in FIG. 5C.

<Right to Left Slide>

Figure 6A:
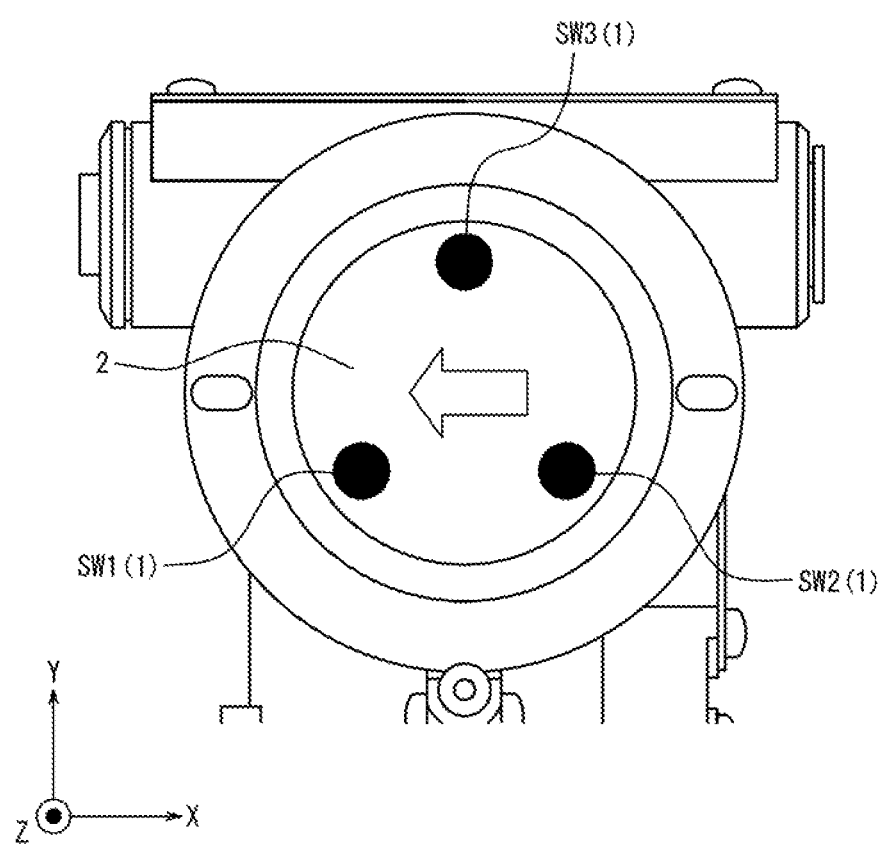
FIG. 6A illustrates movement for slide input in the negative direction of the x-axis.
Figure 6B:
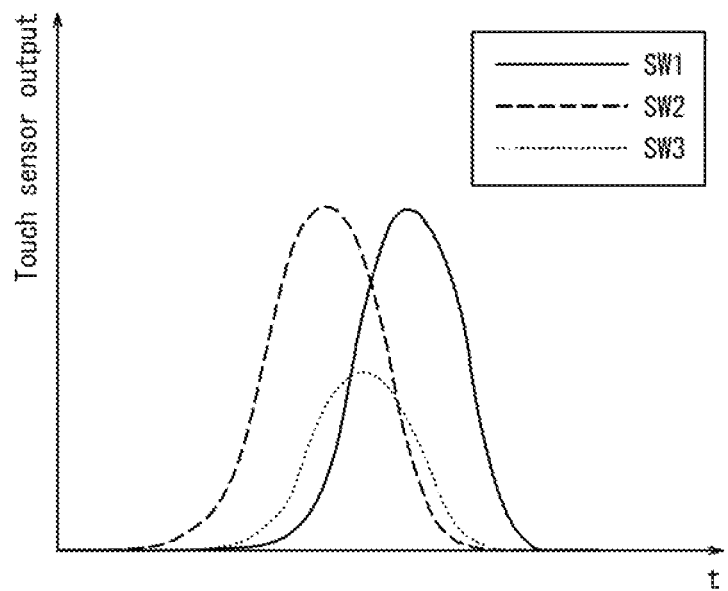
FIG. 6B is a graph illustrating the charge in the output of each touch sensor due to the slide input illustrated in FIG. 6A.

FIG. 6A illustrates the case of the contacting object sliding on the surface of the cover 2 in the negative direction of the x-axis, as indicated by the arrow. In this case, the output of the touch sensors SW1, SW2, SW3 is illustrated in the graph of FIG. 6B. The horizontal axis in the graph of FIG. 6B represents the passage of time (t). The vertical axis represents the output of each touch sensor 1. First, the output of the touch sensor SW2 located on the side of the positive direction of the x-axis (right side) increases. Next, the output of the touch sensor SW3 located farther in the negative direction of the x-axis (left side) than the touch sensor SW2 increases. Furthermore, the output of the touch sensor SW1 located farther in the negative direction of the x-axis (left side) than the touch sensor SW3 increases.

Figure 6C:
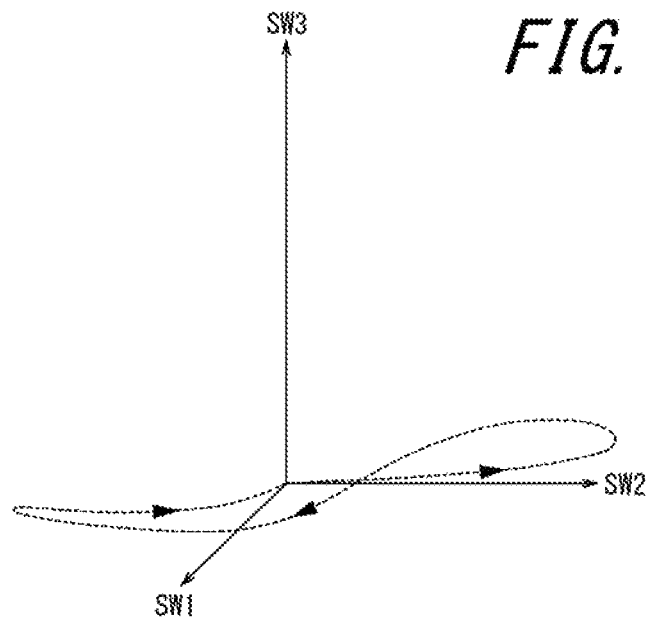
FIG. 6C is a graph illustrating a trajectory based on the output of each, touch sensor illustrated in FIG. 6B.

The output of each touch sensor 1 illustrated in FIG. 6B is associated with time as a parameter to be represented as the trajectory illustrated in FIG. 6C. In FIG. 6C, the three orthogonal axes SW1, SW2, SW3 constitute the basis of a three-dimensional space and respectively represent the output of the touch sensors SW1, SW2, SW3. The trajectory represented in FIG. 6C departs from the origin and proceeds in the direction of increasing output of the touch sensor SW2. Next, the trajectory proceeds in the direction of increasing output of the touch sensor SW3. While the output of the touch sensor SW3 is increasing, the output of the touch sensor SW2 increases to its maximum value and then starts to decrease. The trajectory then proceeds in the direction of increasing output of the touch sensor SW1. While the output of the touch sensor SW1 is increasing, the output of the touch sensor SW3 increases to its maximum value and then starts to decrease. The trajectory then proceeds in the direction of decreasing output of the touch sensor SW1 and returns to the origin.

When the user provides slide input, the controller 12 acquires the output of each touch sensor 1 and generates the trajectory. The controller 12 may judge that input sliding on the surface of the cover 2 in the negative direction of the x-axis has been provided when the trajectory matches or is similar to the trajectory illustrated in FIG. 6C.

<Left to Right Slide>

Figure 7A:
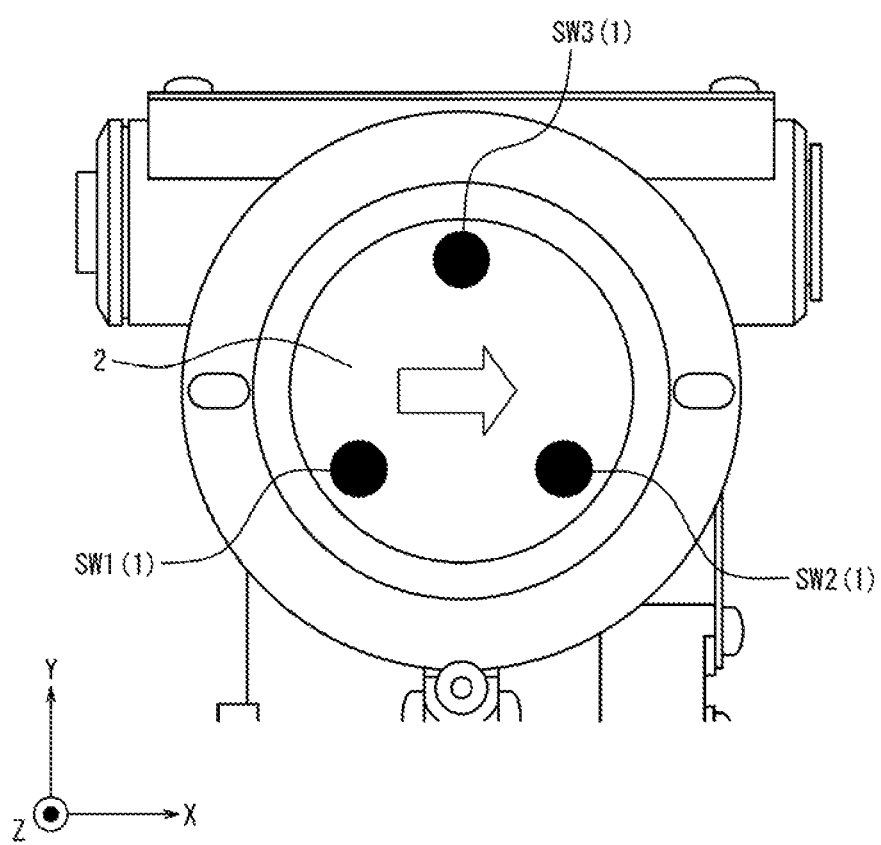
FIG. 7A illustrates movement for slide input in the positive direction of the x-axis.
Figure 7B:
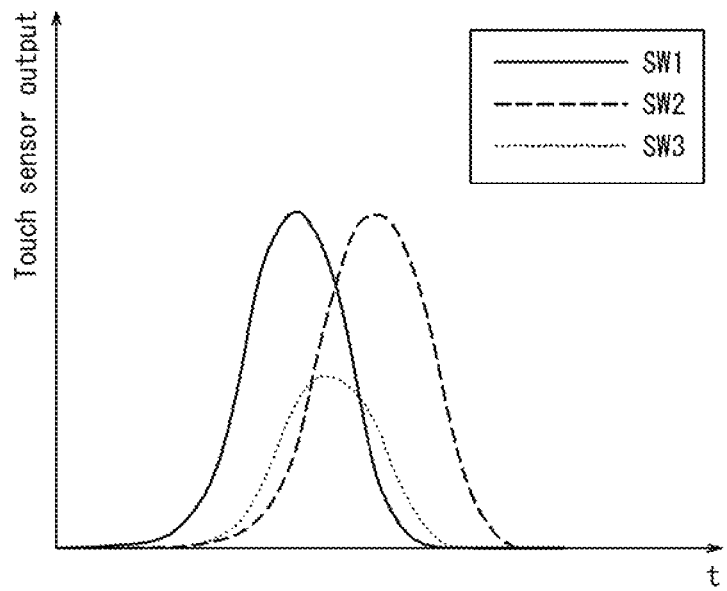
FIG. 7B is a graph illustrating the change in the output of each touch sensor due to the slide input illustrated in FIG. 7A.

FIG. 7A illustrates the case of the contacting object sliding on the surface of the cover 2 in the positive direction of the x-axis, as indicated by the arrow. In this case, the output of the touch sensors SW1, SW2, SW3 is illustrated in the graph of FIG. 7B. The horizontal axis in the graph of FIG. 7B represents the passage of time (t). The vertical axis represents the output of each touch sensor 1. First, the output of the touch sensor SW1 located on the side of the negative direction of the x-axis (left side) increases. Next, the output of the touch sensor SW3 located farther in the positive direction of the x-axis (right side) than the touch sensor SW1 increases. The output of the touch sensor SW2 located farther in the positive direction of the x-axis (right side) than the touch sensor SW3 then increases.

Figure 7C:
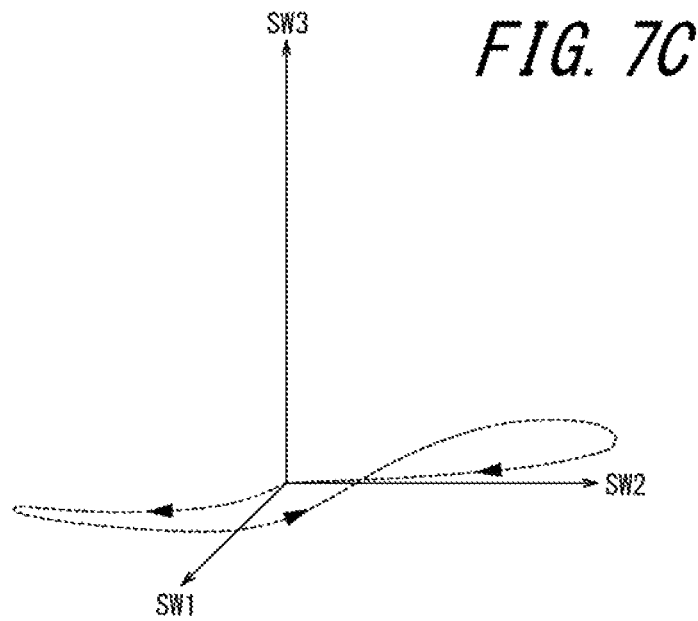
FIG. 7C is a graph illustrating a trajectory based on the output of each touch sensor illustrated in FIG. 7B.
Figure 8A:
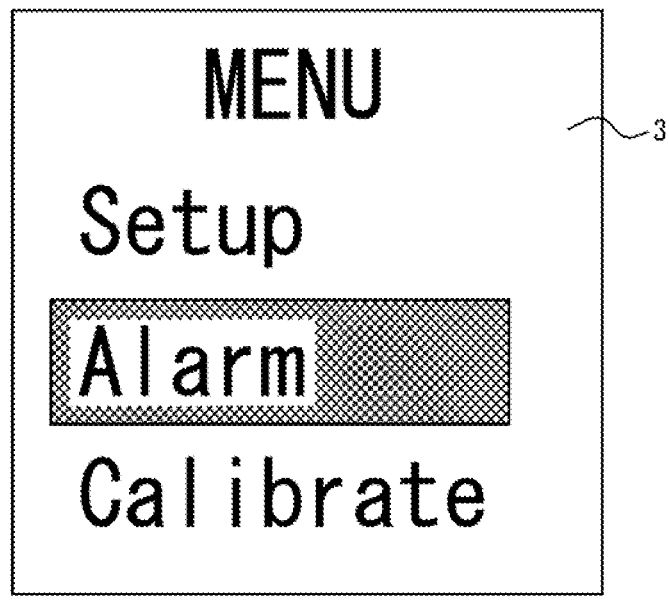
FIG. 8A illustrates an example of an upper-level menu screen of a field device.
Figure 8B:
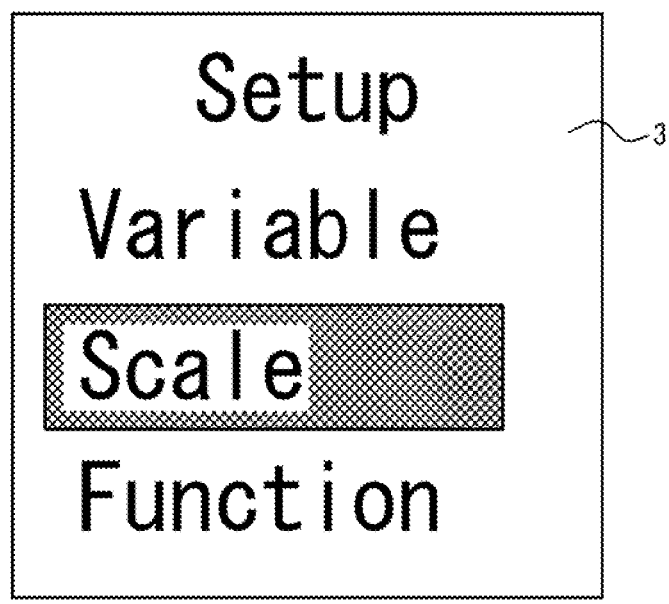
FIG. 8B illustrates an example of a lower-level menu screen of a field device.

The output of each touch sensor 1 illustrated in FIG. 7B is associated with time as a parameter to be represented as the trajectory illustrated in FIG. 7C. In FIG. 7C, the three orthogonal axes SW1, SW2, SW3 constitute the basis of a three-dimensional space and respectively represent the output of the touch sensors SW1, SW2, SW3. The trajectory represented in FIG. 7C departs from the origin and proceeds in the direction of increasing output of the touch sensor SW1. Next, the trajectory proceeds in the direction of increasing output of the touch sensor SW3. While the output of the touch sensor SW3 is increasing, the output of the touch sensor SW1 increases to its maximum value and then starts to decrease. The trajectory then proceeds in the direction of increasing output of the touch sensor SW2. While the output of the touch sensor SW2 is increasing, the output of the touch sensor SW3 increases to its maximum value and then starts to decrease. The trajectory then proceeds in the direction of decreasing output of the touch sensor SW2 and returns to the origin.

When the user provides slide input, the controller 12 acquires the output of each touch sensor 1 and generates the trajectory. The controller 12 may judge that input sliding on the surface of the cover 2 in the positive direction of the x-axis has been provided when the trajectory matches or is similar to the trajectory illustrated in FIG. 7C.

<Slide in a Predetermined Direction>

Examples of detecting input such that the contacting object slides in a direction along the x-axis or the y-axis have been described. Input such that the contacting object slides in any direction inclined at a predetermined angle relative to the x-axis or the y-axis, for example, can also be detected.

The controller 12 acquires, in advance, the trajectory when the contacting object slides in a predetermined direction. When the user provides slide input, the controller 12 acquires the output of each touch sensor 1. The controller 12 associates the output of each touch sensor 1 with time as a parameter to be represented as a trajectory. The controller 12 may judge that input sliding along a predetermined pattern has been provided when the trajectory matches or is similar to the trajectory acquired in advance.

<Pattern Input>

Examples of detecting input such that the contacting object slides in one direction have been described. Input such that the contacting object slides along a predetermined pattern, such as the letter Z or O, can also be detected.

The controller 12 acquires, in advance, the trajectory when the contacting object slides along a predetermined pattern. When the user provides slide input, the controller 12 acquires the output of each touch sensor 1 and generates the trajectory. The controller 12 may judge that input sliding along a predetermined pattern has been provided when the trajectory matches or is similar to the trajectory acquired in advance.

A pattern traceable with one stroke may be adopted as the predetermined pattern. With this configuration, the controller 12 can judge input based on one trajectory. A slide operation along a predetermined pattern can thereby easily be detected.

The controller 12 may monitor whether a contacting object is in contact with the surface of the cover 2. The controller 12 may acquire the output of each touch sensor 1 from when contact by the contacting object on the surface of the cover 2 begins to be detected until contact by the contacting object on the surface of the cover 2 is no longer detected and treat a trajectory based on the output during this time as one trajectory to judge the inputted pattern.

As described above, the detection apparatus 10 according to the present embodiment can judge the pattern of slide input without converting the output of the touch sensors 1 to coordinates of the contact position but rather by directly processing time variable data of the output. This enables the number of processing steps to be reduced as compared to the detection apparatus 90 according to the comparative example (see FIG. 1). A slide operation can thereby easily be detected. Furthermore, avoiding conversion to coordinates of the contact position prevents erroneous input that would be caused by error generated during coordinate conversion. In other words, it becomes unnecessary to increase the number of touch sensors for a reduction in the conversion error of coordinates. The detection apparatus 10 according to the present embodiment can therefore reduce erroneous input without increasing the number of touch sensors 1.

The detection apparatus 10 according to the present embodiment can easily judge the pattern of slide input by processing a trajectory in N-dimensional space that has the output of the touch sensors 1 as coordinate axes.

As described above, the magnitude of the detection signal of the touch sensors 1 is uniquely determined in accordance with the distance from the position contacted by the contacting object to the touch sensors 1. The trajectory when the contacting object slides along a predetermined pattern is thereby uniquely determined for each pattern. Consequently, erroneous input can be reduced.

Operation Example of Field Device

The field device 100 may display a menu screen on the display 3 and receive operation input from the user. The controller 12 of the field device 100 may, for example, cause the display 3 to display the menu screen illustrated in 8A. The "Setup" item may be an item for setting the parameters of the field device 100. The "Alarm" item may be an item for setting alarm criteria in the field device 100. The "Calibrate" item may be an item for performing calibration of the field device 100.

Suppose that the "Setup" item is selected. In this case, the controller 12 of the field device 100 may cause the display 3 to display the menu screen illustrated in 8B. The "Variable" item may be an item for setting the type, units, or the like of the value outputted by the field device 100. The "Function" item may be an item for setting calculation processing, such as averaging or taking the root mean square of the value outputted by the field device 100. The "Scale" item may be an item for setting the upper limit and the lower limit of the measurement result of the physical quantity measurement unit 40, which are associated with the upper limit and lower limit of the signal outputted by the field device 100.

The menu screen may be layered. The number of layers in the menu screen is not limited to two, and the number may be three or greater.

When slide input is provided, the controller 12 may move the highlighted item on the menu screen. For example, when the controller 12 judges that the slide input exemplified in FIG. 4A (slide input from top to bottom) has been provided, the controller 12 may unhighlight the currently highlighted item and highlight the item below. For example, when the controller 12 judges that the slide input exemplified in FIG. 5A (slide input from bottom to top) has been provided, the controller 12 may change the display to unhighlight the currently highlighted item and highlight the item above.

When slide input is provided, the controller 12 may change the layer of the menu screen. For example, when the controller 12 judges that the slide input exemplified in FIG. 6A (slide input from right to left) has been provided, the controller 12 may cause the display 3 to display the menu screen of the layer that is one higher than the layer of the currently displayed menu screen. For example, when the controller 12 judges that the slide input exemplified in FIG. 7A (slide input from left to right) has been provided, the controller 12 may cause the display 3 to display the menu screen of the layer that is one lower than the layer of the currently displayed menu screen.

When slide input is provided, the controller 42 may execute the command displayed on the menu screen. For example, when slide input of a predetermined pattern, such as the Z, is provided, the controller 12 may execute the highlighted command.

The relationships between commands for operating the field device 100 and patterns of slide input are not limited to the above examples. The controller 12 may move the highlighted item when slide input differing from slide input in the up-down direction is provided. The controller 12 may change the layer of the menu screen when slide input differing from slide input in the left-right direction is provided. The controller 12 may execute various operations using, as a condition, the slide inputs of various patterns.

The detection of slide input according to the present embodiment is not limited to simple LPS operation input but can also be applied to an unlocking operation to prevent erroneous operation. For example, the field device 100 may be configured to be unlocked and to enable the LPS function by a particular pattern being traced with a finger on the cover 2.

(Flowchart)

Figure 9:
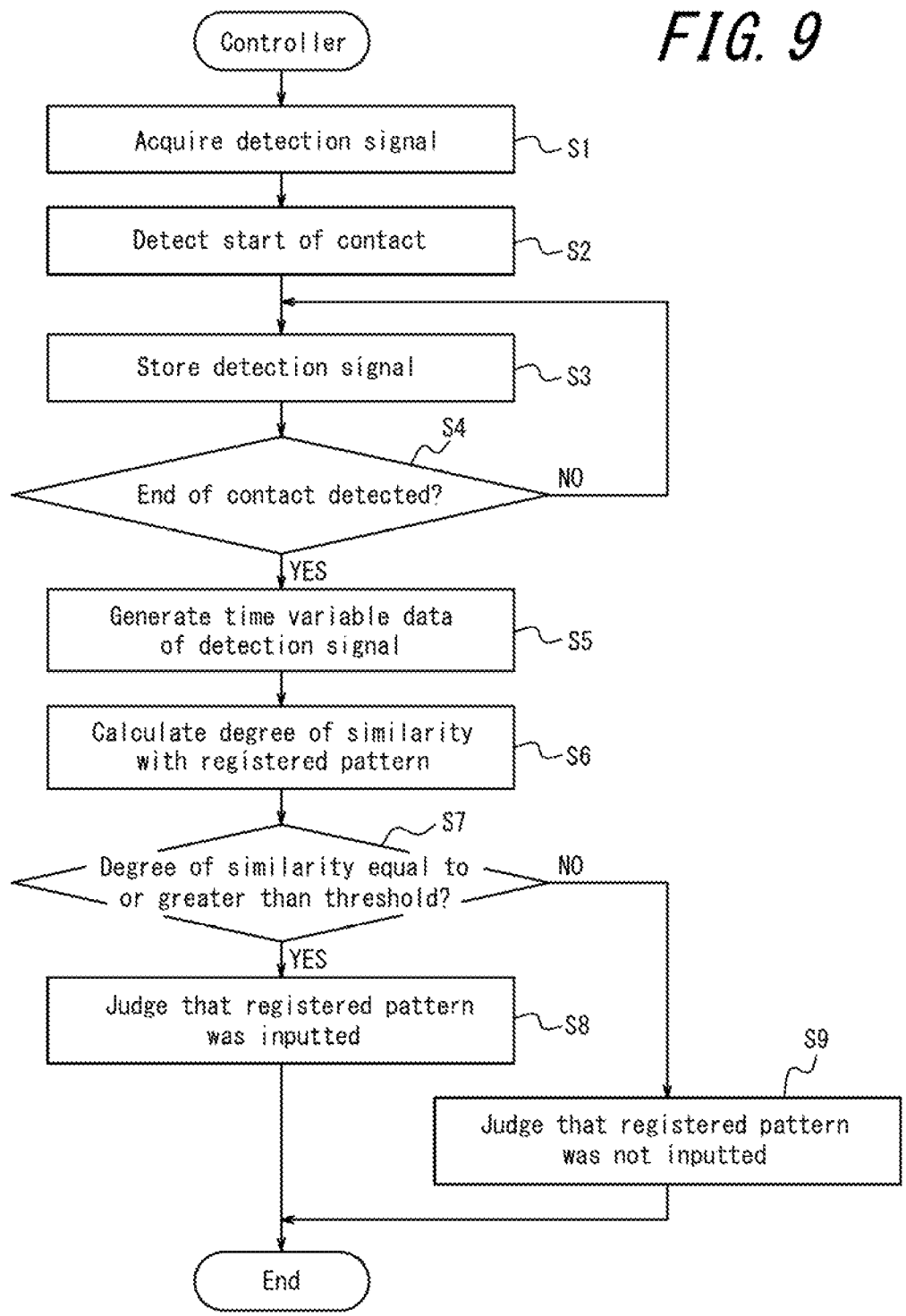
FIG. 9 is a flowchart illustrating art example of the procedures of a detection method according to an embodiment of the present disclosure.

The detection apparatus 10 may execute the procedures illustrated in the flowchart of FIG. 9 as a method of detecting slide input. The procedures illustrated in the flowchart of FIG. 9 may be implemented as a detection program to be executed by a processor. The detection program may be stored on a non-transitory computer-readable medium.

The controller 12 of the detection apparatus 10 acquires a detection signal from the plurality of touch sensors 1 (step S1). The controller 12 may continue to acquire the detection signal.

Based on the detection signal, the controller 12 detects that the contacting object has started to contact the cover 2 (step S2). The controller 12 may repeat the procedures of steps S1 and S2 until detecting that the contacting object has started to be in contact.

The controller 12 stores the detection signal acquired after the contacting object starts to be in contact (step S3). The controller 12 may store the detection signal in the memory. The controller 12 may store the detection signal as a continuous signal or may store the detection signal as discrete signals sampled at a predetermined timing. The predetermined timing may be a cyclical timing or may be an irregular timing.

The controller 12 judges whether termination of contact by the contacting object has been detected (step S4). When termination of contact by the contacting object has not been detected (step S4: NO), i.e. when it is detected that the contacting object is still in contact, the controller 12 returns to the procedure step S3 and continues to store the detection signal.

When termination of contact by the contacting object has been detected (step S4: YES), the controller 12 terminates storage of the detection signal and generates time variable data of the detection signal acquired during contact by the contacting object (step S5). The time variable data includes data associating time and the magnitude of the detection signal.

The controller 12 calculates the degree of similarity between a registered pattern corresponding to a pattern that the controller 12 treats as operation input of the field device 100 and the input pattern corresponding to the pattern of a slide inputted by the contacting object from the procedure of step S2 until the procedure of step S4 (step S6). The registered pattern may, for example, include a pattern to slide in the up-down direction or the left-right direction. The registered pattern may, for example, include a predetermined pattern such as the letter Z or the letter O.

The controller 12 acquires, in advance, time variable data of the detection signal when slide input is provided in the predetermined pattern. The controller 12 may store the time variable data acquired in advance in the memory. The controller 12 may acquire, in advance, time variable data corresponding to a plurality of registered patterns.

The controller 12 compares the time variable data generated by the procedure of step S5 with the time variable data acquired in advance and calculates the degree of similarity between these sets of data. The method of calculating the degree of similarity is described below. The calculated degree of similarity is considered the degree of similarity between the registered pattern and the input pattern.

The controller 12 judges whether the calculated degree of similarity is equal to or greater than a threshold (step S7).

When the degree of similarity is equal to or greater than the threshold (step S7: YES), the controller 12 judges that input of the registered pattern has been provided (step S8). After executing the procedure of step S8, the controller 12 ends the procedures of the flowchart in FIG. 9.

When the degree of similarity is not equal to or greater than a threshold (step S7: NO), i.e. when the degree of similarity is less than the threshold, the controller 12 judges that input of the registered pattern has not been provided (step S9). After executing the procedure of step S9, the controller 12 ends the procedures of the flowchart in FIG. 9.

The controller 12 controls the components of the field device 100 based on the judgment result obtained lay execution of the procedures of the flowchart in FIG. 9.

As described above, the detection method according to the present embodiment enables judgment of the pattern of slide input without the need to convert the detection signal of the touch sensors 1 to coordinates of the contact position. This enables the number of processing steps to be reduced as compared to the detection apparatus 90 according to the comparative example (see FIG. 1). Consequently, erroneous input can be reduced.

In the detection apparatus 10 and the detection method according to the present embodiment, the controller 12 acquires time variable data corresponding to the slide input of a predetermined pattern in advance. The controller 12 generates time variable data based on the output of the touch sensors 1 produced by slide input from the user. The controller 12 judges whether the slide input from the user corresponds to slide input of a predetermined pattern. In other words, the controller 12 targets slide input from the user for judgment of whether slide input of a predetermined pattern is provided. The slide input from the user that becomes the target for judgment of whether slide input of a predetermined pattern is provided is also referred to as input for judgment. The controller 12 calculates the degree of similarity between the time variable data, acquired in advance, corresponding to the slide input of a predetermined pattern and the time variable data corresponding to the input for judgment. Based on the degree of similarity, the controller 12 judges whether slide input of the predetermined pattern is provided. With this configuration, the controller 12 can easily judge the slide input.

To acquire the registered pattern, controller 12 may operate the field device 100 in teaching mode. The controller 12 may store the pattern of slide input that is inputted in the teaching mode as a registered pattern.

Example Calculation of Degree of Similarity by Detection Apparatus

The method, executed by the controller 12 as the procedure of step S6 in FIG. 9, for calculating the degree of similarity is now described in detail.

Calculation Example 1

Similarity Judgment of Trajectory

Figure 10:
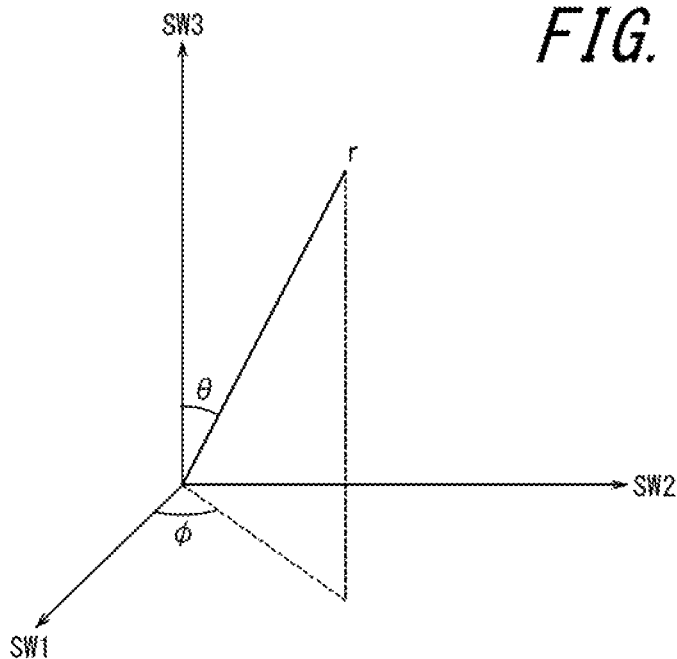
FIG. 10 illustrates the parameters of a polar coordinate system.

As illustrated in FIG. 10, polar coordinates are introduced into a three-dimensional space having, as a basis, the axes representing the output of the touch sensors SW1, SW2, and SW3. Polar coordinates are a coordinate system identifying the position of a predetermined point by the three parameters r, θ, and φ. First, r represents the distance from the origin to the predetermined point. Next, θ represents the angle between a line segment from the origin to the predetermined point and the axis corresponding to SW3. In other words, θ represents the angle of rotation relative to the axis corresponding to SW3. Finally, φ represents the angle between a line segment, from the origin to a point that is the projection of the predetermined point onto the SW1-SW2 plane, and the axis corresponding to SW1. In other words, φ represents the angle of rotation, relative to the axis corresponding to SW1, in the SW1-SW2 plane. The values of θ and φ vary within a range from 0 to π/2.

The outputs of the touch sensors SW1, SW2, and SW3 are simply represented as SW1, SW2, and SW3. The relationship between the values of SW1, SW2, and SW3 and the parameters of the polar coordinates is expressed by Equation (1) below.

$$(SW1 SW2 SW3) = (r \sin \theta \cos \phi\ r \sin \theta \sin \phi\ r \cos \theta) \quad (1)$$

The controller 12 can calculate r, θ, and φ by substituting the outputs of the touch sensors SW1, SW2 and SW3 into Equation (1). The predetermined point forming part of a trajectory based on the outputs of the touch sensors SW1, SW2, and SW3 is identified by r, θ, and φ.

When a contacting object, such as the user's finger or stylus, contacts the surface of the cover 2 and slides in the up-down direction, the distance from the touch sensor SW3 to the contact position varies greatly. Consequently, the output of the touch sensor SW3 varies greatly. The value of θ may vary greatly along with the variation in the output of the touch sensor SW3. If the slide is in the left-right direction, the distance from the touch sensors SW1 and SW2 to the contact position varies greatly. Consequently, the output of the touch sensor SW1 and SW2 varies greatly. The value of φ may vary greatly along with the variation in the output of the touch sensors SW1 and SW2.

Figure 11:
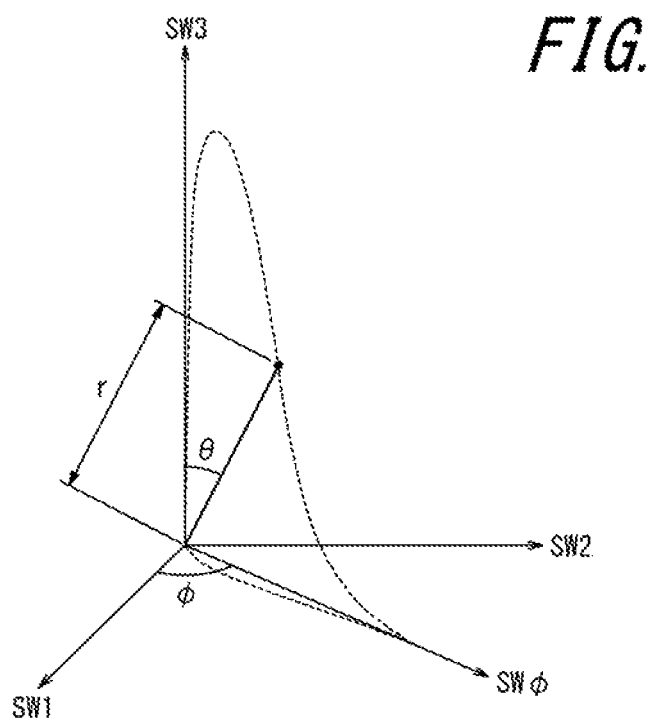
FIG. 11 illustrates an example of a trajectory traced in three-dimensional space.

FIG. 11 illustrates an example of a trajectory based on output of each touch sensor 1 when a contacting object, such as the user's finger or a stylus, contacts the surface of the cover 2 and slides in the up-down direction. Any point included in the trajectory is represented by polar coordinates. The parameters of the polar coordinates, r, θ, and φ, can all change. For the sake of explanation, however, φ is considered to be constant, and only the change in θ and r is examined. In the example of FIG. 11, the trajectory is considered to be traced within a range such that φ is constant. In this case, an axis extending in a direction inclined by an angle φ relative to the axis corresponding to SW1 is assumed to exist. This axis is represented as SWφ.

Figure 12:
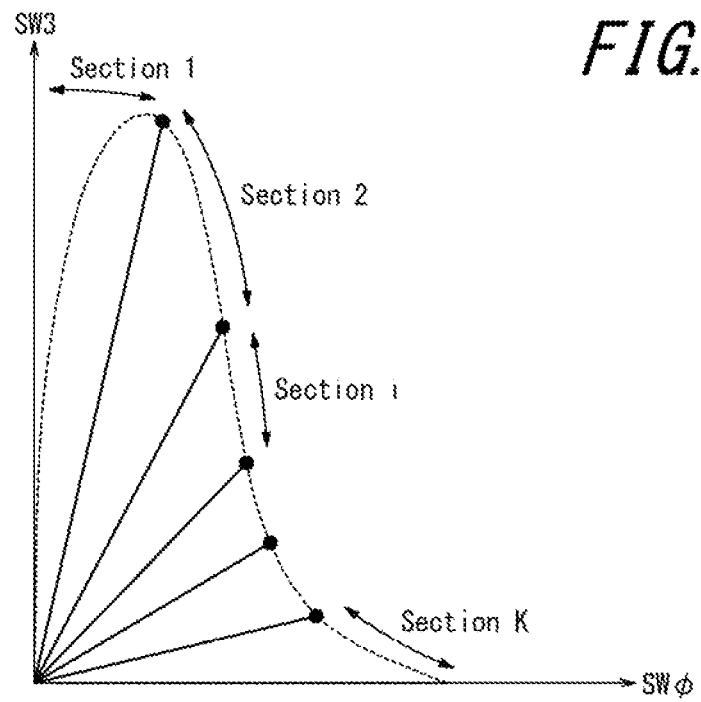
FIG. 12 illustrates an example of dividing a trajectory traced in the SWφ-SW3 plane into sections.

Under this assumption, the trajectory is traced in the SWφ-SW3 plane, as illustrated in FIG. 12. The value of φ identifying any point included in the trajectory is constant. The value of φ varies in a range from 0 to π/2. The trajectory may be divided into a plurality of sections. In FIG. 12, the trajectory is divided into k sections from a first section to a $k^{th}$ section. The values of θ that identify the points included in each section of the trajectory are divided into the k sections corresponding to the trajectory.

The value of θ that identifies a predetermined point included in the trajectory is included in one of the k sections. The value of r that identifies a predetermined point can be represented as a function that takes θ as an argument. The controller 12 calculates the section, among the k sections, that includes the value of θ corresponding to the contact position of the contacting object. The controller 12 also calculates the value of r in the case of the value of θ being included in the $i^{th}$ section. The controller 12 judges the section in which the value of θ is included and judges the value of r at that time using a hidden Markov model.

Figure 13:
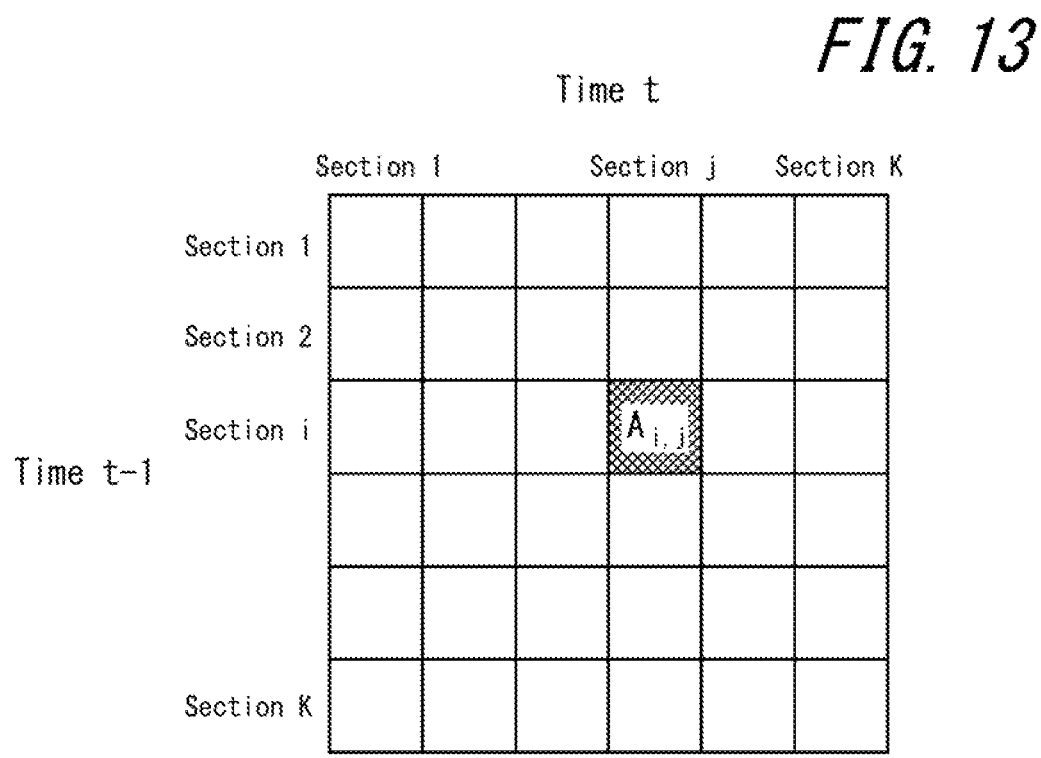
FIG. 13 is a table illustrating the elements of a matrix A representing the transition probability of a section including θ in a hidden Markov model.

The state transition probability is defined in a hidden Markov model. The state corresponds to the section in which the value of θ is included. For example, when θ is included in the $i^{th}$ section at time t−1, the probability that θ is included in the $j^{th}$ section at time t is defined as a transition probability and is represented as $A_{i,j}$. In other words, $A_{i,j}$ corresponds to the probability that θ will transition from the $i^{th}$ section to the $j^{th}$ section when proceeding from time t−1 to time t. When the number of sections is k, the number of states is k. The transition probability between k states can be represented as a k×k matrix A. The transition probability $A_{i,j}$ constitutes an element of the matrix A. The elements of the matrix A can be represented in the shape of the table included in FIG. 13. In the table in FIG. 13, the section in which θ is included at time t−1 corresponds to a row. The section in which θ is included at time t corresponds to a column. The transition probability $A_{i,j}$ is listed in the cell that corresponds to the row of the $i^{th}$ section and the column of the $j^{th}$ section.

Considering how the trajectory is continuous, the probability that θ transitions to a neighboring section tends to be higher than the probability that θ transitions to a distant section. For example, $A_{i,\ i+1}$ tends to be higher than $A_{i,\ i+2}$. Furthermore, $A_{i,\ 1}$ or $A_{i,\ k}$ tends to be close to zero.

Figure 14:
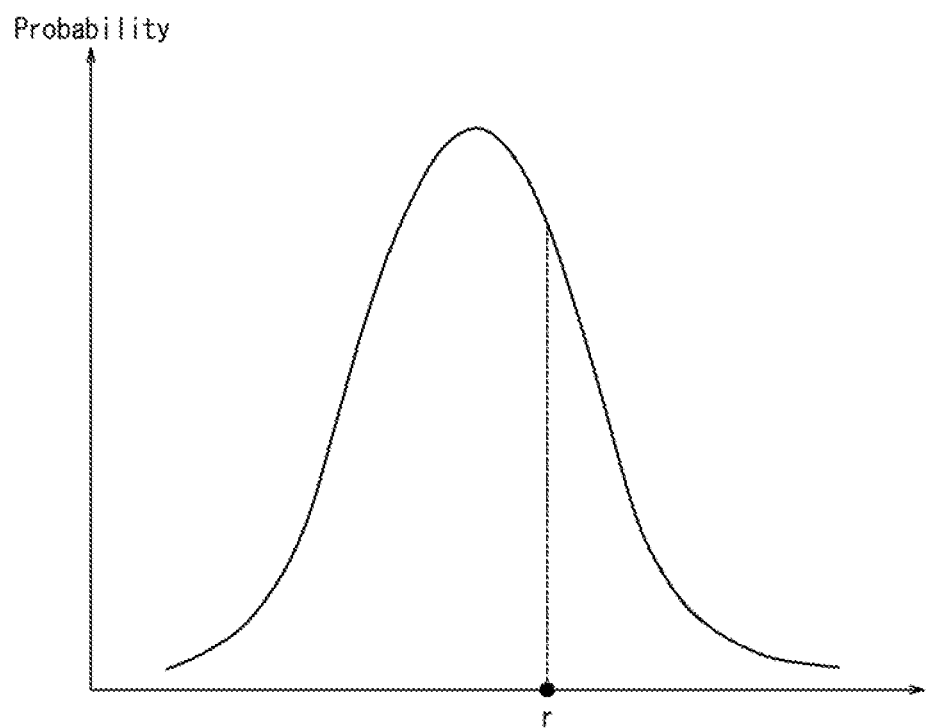
FIG. 14 illustrates a probability distribution of the value of r when θ is included in section i.

In a hidden Markov model, r is a continuous random variable. The value of r is represented by a probability distribution, as in the example in FIG. 14. The probability distribution may be represented as following a normal distribution. The probability distribution is generated for each section in which θ is included. For example, the probability distribution for the value of r when θ is included in the $i^{th}$ section and the probability distribution for the value of r when θ is included in the $j^{th}$ section are generated as separate probability distributions.

In this way, a hidden Markov model is defined by a matrix of the transition probability of the section in which θ is included and the probability distribution of the value of r when θ is included in the $i^{th}$ section. The controller 12 estimates the matrix of the transition probability of the section in which θ is included and the probability distribution of the value of r when θ is included in the $i^{th}$ section based on the change in the polar coordinate parameters of the trajectory when slide input of a certain pattern is provided. The hidden Markov model is estimated in this way.

The controller 12 may estimate the hidden Markov model for each of the cases of the contacting object in contact with the surface of the cover 2 sliding from top to bottom and sliding from bottom to top. The controller 12 may estimate the hidden Markov model for each pattern of slide input. The controller 12 associates the estimated hidden Markov models with patterns of slide input. The controller 12 may store the estimated hidden Markov models in the memory in association with patterns of slide input.

The controller 12 acquires the sections in which θ is included and the values of r during a period from the start to the end of detection of contact by the contacting object on the surface of the cover 2 and generates time variable data in which the acquired information is arranged in a time series. The section in which θ is included at time t is represented as $z_t$. The value of r at time t is represented as $r_t$. When the start time of contact detection is 0 and the end time is T, the time variable data includes T+1 sets of data from $(z_0, r_0)$ to $(z_T, r_T)$. At the time when the controller 12 generates the time variable data, it is not known which pattern of slide input was provided.

The controller 12 calculates the simultaneous probability of the generated time variable data using a hidden Markov model. The simultaneous probability is calculated based on parameters that specify a hidden Markov model. The parameters that specify a hidden Markov model include the matrix A, representing the transition probability, and the probability distribution of r. The simultaneous probability represents the probability, in the hidden Markov model, of the state of θ transitioning according to predetermined time variable data and of r being generated. When the simultaneous probability is high, the probability is high that the time variable data fitted to the hidden Markov model was generated by slide input of the pattern associated with the hidden Markov model. The simultaneous probability can be considered the degree of similarity.

When the degree of similarity (simultaneous probability) is equal to or greater than a threshold, the controller 12 may judge that slide input of the pattern associated with the corresponding hidden Markov model has been provided. The controller 12 may judge that slide input of the pattern associated with the hidden Markov model having the highest degree of similarity (simultaneous probability) has been provided. When the highest degree of similarity (simultaneous probability) is less than a threshold, i.e. when the degree of similarity (simultaneous probability) is not equal to or greater than the threshold for any of the hidden Markov models to which data is fitted, the controller 12 may judge that slide input of a pattern identified in advance has not been provided.

In the above explanation, φ has been described as being constant, but the same approach can be applied when θ is considered to be constant. Accordingly, the controller 12 can judge whether slide input in the left-right direction is provided by calculating the simultaneous probability.

The same approach can also be applied when both θ and φ change. Accordingly, the controller 12 is not limited to judging a unidirectional slide and can judge whether slide input of a predetermined pattern, such as the letter Z or O, is provided by calculating the simultaneous probability.

Calculation Example 2

Similarity Judgment by Polynomial Approximation

The controller 12 may calculate the degree of similarity by treating the output of the touch sensors SW1, SW2, and SW3, acquired while the contacting object touches and slides on the surface of the cover 2, as functions of time. A signal representing the output of the touch sensors 1 as a function of time is also referred to as an output signal. In the present example, the controller 12 represents the output signal as a function of time and calculates the degree of similarity with the reference signal.

The output signal obtained upon provision of slide input of a certain pattern is considered a reference signal associated with slide input of the pattern. The reference signal associated with slide input of a predetermined pattern is also referred to as the reference signal of the predetermined pattern. For example, the output signal when slide input from top to bottom is provided is considered a reference signal for slide input from top to bottom. The controller 12 may use, as the reference signal, the output signal calculated by linear interpolation of the output of each touch sensor 1 acquired at discrete times when slide input of the predetermined pattern is provided in advance. The controller 12 may use, as the reference signal, the output signal acquired by continuous acquisition of the output of each touch sensor 1 when slide input of the predetermined pattern is provided in advance. The controller 12 may acquire the reference signal for each pattern of slide input from top to bottom, slide input from left to right, and the like.

The controller 12 calculates the output signal by linear interpolation of the values, acquired at discrete times, outputted by each touch sensor 1 based on slide input for which the pattern is unknown. The controller 12 calculates the degree of similarity between the reference signal and the output signal. When the degree of similarity is equal to or greater than a threshold, the controller 12 may judge that slide input of the pattern associated with the reference signal has been provided. The controller 12 may calculate the degree of similarity with the output signal for a plurality of reference signals and judge that slide input of the pattern associated with the reference signal yielding the greatest degree of similarity has been provided. When the highest degree of similarity is less than a threshold, i.e. when the degree of similarity is not equal to or greater than the threshold for any reference signal, the controller 12 may judge that slide input of a pattern identified in advance has not been provided.

The controller 12 may calculate the degree of similarity between the reference signal and the output signal as follows.

The signals used in this explanation are represented by Equations (2) to (6) below. Equation (2) represents the output signal of the touch sensors 1. Equation (3) represents the reference signal corresponding to the slide input from top to bottom. Equation (4) represents the reference signal corresponding to the slide input from bottom to top. Equation (5) represents the reference signal corresponding to the slide input from left to right. Equation (6) represents the reference signal corresponding to the slide input from right to left.

$$r(t)=(s_1(t)s_2(t)s_3(t))^t \quad (2)$$

$$r_{ref}^{\downarrow}(t)=(s_1^{\downarrow}(t)s_2^{\downarrow}(t)s_3^{\downarrow}(t))^t \quad (3)$$

$$r_{ref}^{\uparrow}(t)=(s_1^{\uparrow}(t)s_2^{\uparrow}(t)s_3^{\uparrow}(t))^t \quad (4)$$

$$r_{ref}^{\rightarrow}(t)=(s_1^{\rightarrow}(t)s_2^{\rightarrow}(t)s_3^{\rightarrow}(t))^t \quad (5)$$

$$r_{ref}^{\leftarrow}(t)=(s_1^{\leftarrow}(t)s_2^{\leftarrow}(t)s_3^{\leftarrow}(t))^t \quad (6)$$

$S_i(t)$ represents the output signal of the touch sensor SW_i. $S_i^{\downarrow}(t)$ represents the reference signal of the touch sensor SW_i corresponding to the slide input from top to bottom. $S_i^{\uparrow}(t)$ represents the reference signal of the touch sensor SW_i corresponding to the slide input from bottom to top. $S_i^{\rightarrow}(t)$ represents the reference signal of the touch sensor SW_i corresponding to the slide input from left to right. $S_i^{\leftarrow}(t)$ represents the reference signal of the touch sensor SW_i corresponding to the slide input from right to left. Furthermore, i is any of 1, 2, and 3. SW_1, SW_2, and SW_3 may be replaced with SW1, SW2, and SW3.

Figure 15A:
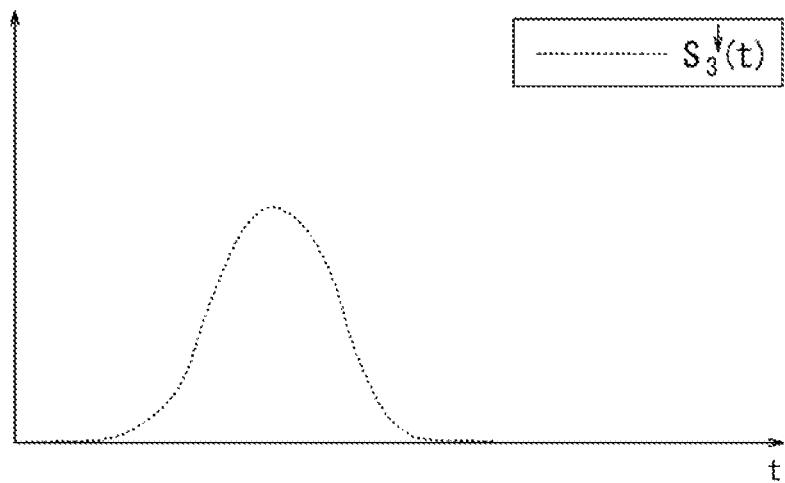
FIG. 15A is a graph illustrating an example of a reference signal of a touch sensor.
Figure 15B:
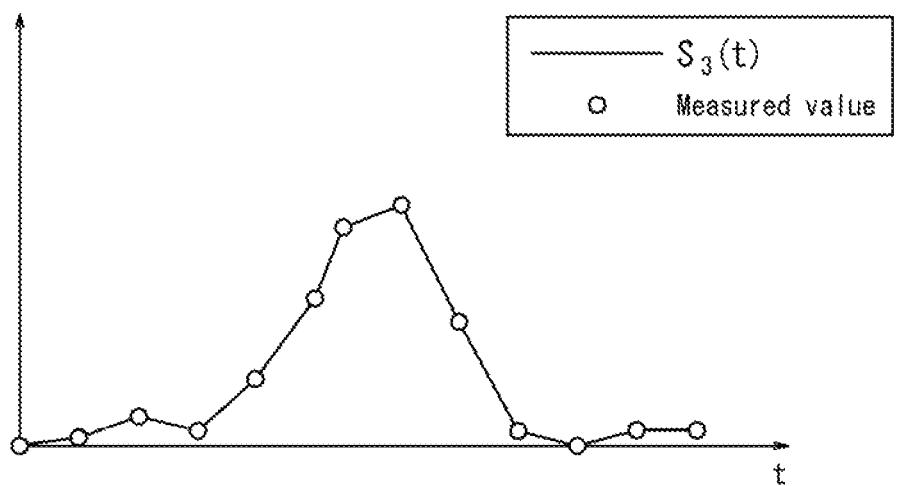
FIG. 15B is a graph illustrating an example of an output signal of a touch sensor.

The reference signal of the touch sensor SW3 acquired as a function of time can be represented by the graph exemplified in FIG. 15A. The output signal of the touch sensor SW3 acquired as a function of time can be represented by the graph exemplified in FIG. 15B. The horizontal axis in FIG. 15A and FIG. 15B represents time. The vertical axis represents the output. FIGS. 15A and 15B illustrate the reference signal and the output of the touch sensor SW3 corresponding to slide input from top to bottom. For the touch sensors SW1 and SW2 as well, the reference signal and the output as functions of time are similarly acquired. The reference signals corresponding to slide input of other patterns are also acquired.

Figure 16A:
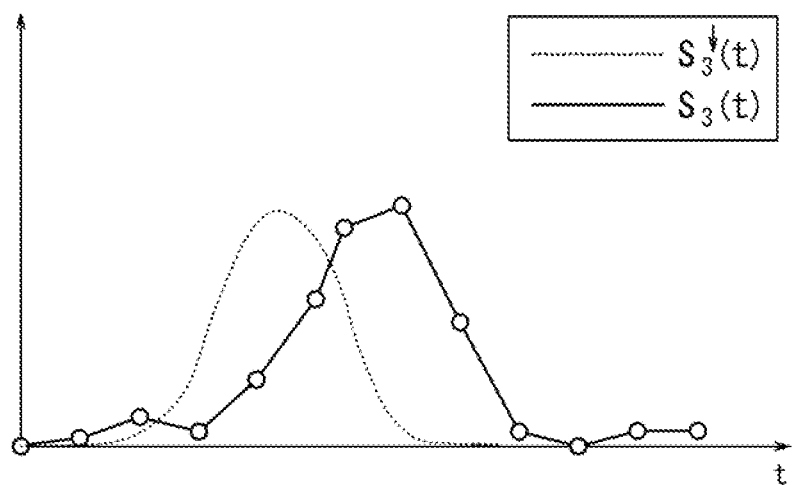
FIG. 16A is a graph representing the difference in scale of the time axis between the output signal and the reference signal.
Figure 16B:
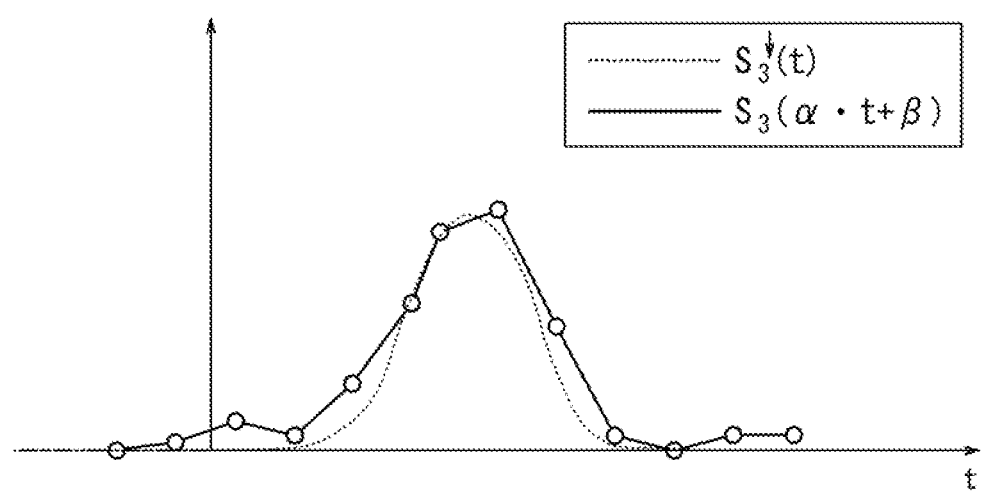
FIG. 16B is a graph representing the case of matching the scale of the output signal to the reference signal.

The reference signal and the output are both acquired as functions of time. When the speeds of the slides differ, the scale of the time axis differs between the graphs of the functions. For example, when the scale of the time axis differs between the graph of $S_3(t)$ and the graph of $S_3^{\downarrow}(t)$ as illustrated in FIG. 16A, the degree of similarity decreases if the controller 12 simply compares these graphs. Accordingly, the controller 12 cannot simply compare the output and the reference signal but rather needs to make a comparison taking account the scale of the time axis.

Figure 17A:
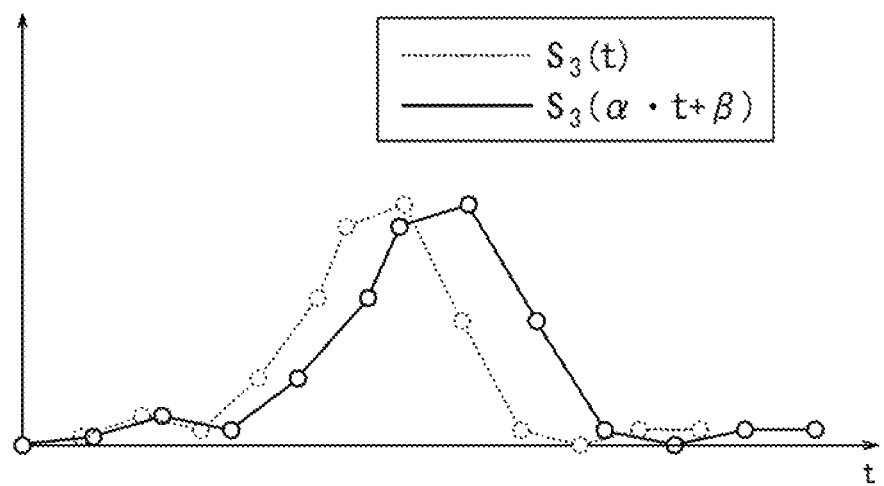
FIG. 17A is a graph representing an output signal stretched out along the time axis.
Figure 17B:
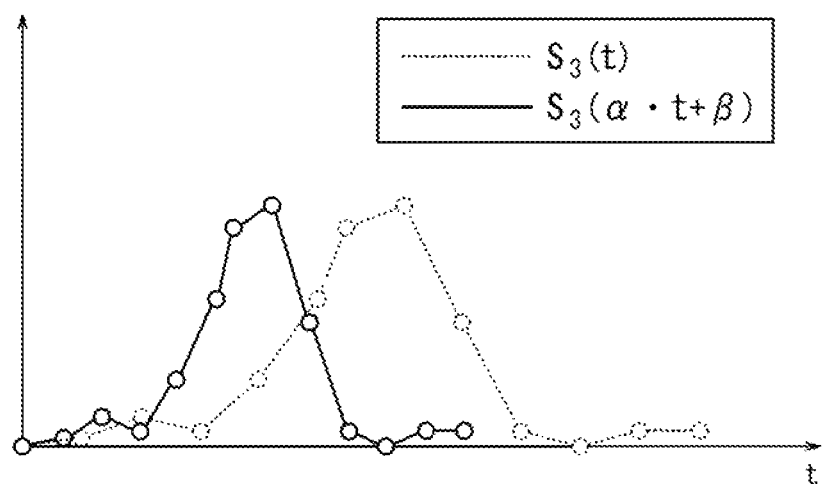
FIG. 17B is a graph representing an output signal compressed along the time axis.
Figure 18A:
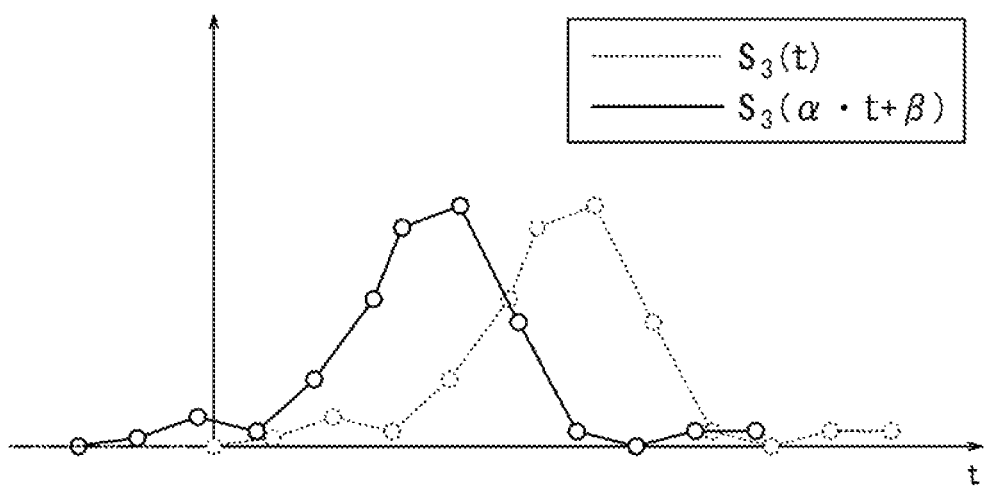
FIG. 18A is a graph representing an output signal translated in the direction backwards in time along the time axis.
Figure 18B:
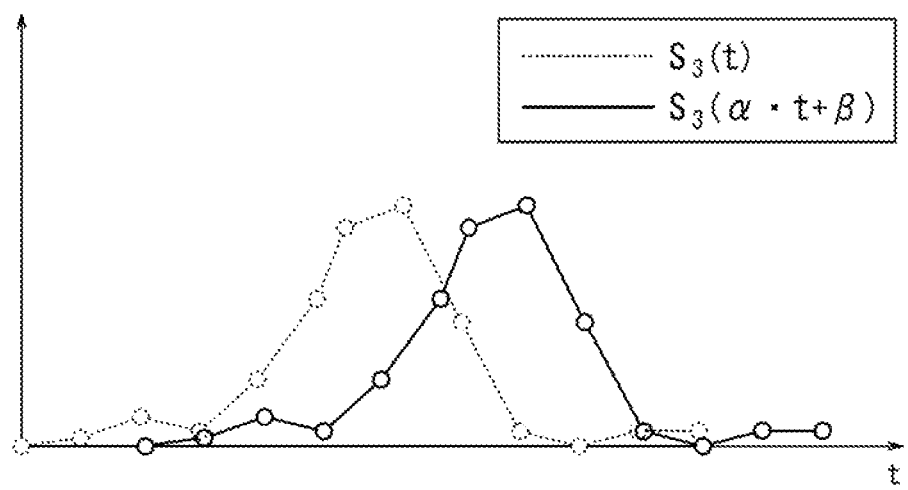
FIG. 18B is a graph representing an output signal translated in the direction forwards in time along; the time axis.

The graph of $S_3(t)$ may therefore be corrected to the graph of $S_3(\alpha \times t + \beta)$ by multiplying the time axis by a coefficient $\alpha$ and then translating by a coefficient $\beta$. The value of $\alpha$ may be selected to satisfy $0<\alpha<1$, in which case the graph of the output of the touch sensors 1 adopts a shape stretched out along the time axis, as illustrated in FIG. 17A. The value of $\alpha$ may be selected to satisfy $\alpha>1$, in which case the graph of the output of the touch sensors 1 adopts a shape compressed along the time axis, as illustrated in FIG. 17B. The value of $\beta$ may be selected to satisfy $\beta>0$, in which case the graph of the output of the touch sensors 1 is translated in the direction backwards in time along the time axis, as illustrated in FIG. 18A. The value of $\beta$ may be selected to satisfy $\beta<0$, in which case the graph of the output of the touch sensors 1 is translated in the direction forwards in time along the time axis, as illustrated in FIG. 18B.

As described above, the controller 12 can transform the graph of the output of the touch sensors 1 by changing the values of $\alpha$ and $\beta$. The controller 12 may prepare predetermined values such as $\alpha_1, \alpha_2, \ldots, \alpha_N$ as the values of $\alpha$ and predetermined values such as $\beta_1, \beta_2, \ldots, \beta_M$ as the values of $\beta$ in advance and calculate the degree of similarity with each predetermined value. The controller 12 may adopt the highest value, among the calculated degrees of similarity for the predetermined values, as the degree of similarity with the reference signal subjected to comparison. The controller 12 may judge that there is no similarity with the reference signal when the highest degree of similarity is below a threshold. This can prevent contact on the surface of the cover 2 from being judged as similar to unintended input, which could lead to erroneous operation.

An example algorithm is illustrated below. The degree of similarity is represented by d. The threshold is represented by $d_{th}$. The optimal value of the degree of similarity is represented by $d_{opt}$ and is a value defined as the degree of similarity when the reference signal and the output signal being compared are most similar.

TABLE 1

Algorithm

Initialize optimal value $d_{opt}$ of degree of similarity and finger movement $m_{opt}$ at that time.
For $\alpha_i$ in ($\alpha_1$ $\alpha_2$ $\alpha_3$ $\alpha_4$ ... $\alpha_N$):
    For $\beta_j$ in ($\beta_1$ $\beta_2$ $\beta_3$ $\beta_4$ ... $\beta_M$):
        Calculate degree of similarity $d(r\ r_{ref}^{\downarrow})$ between $r(\alpha_i \times t + \beta_j)$ and $r_{ref}^{\downarrow}(tt)$
        Calculate degree of similarity $d(r\ r_{ref}^{\uparrow})$ between $r(\alpha_i \times t + \beta_j)$ and $r_{ref}^{\uparrow}(t)$
        Calculate degree of similarity $d(r\ r_{ref}^{\rightarrow})$ between $r(\alpha_i \times t + \beta_j)$ and $r_{ref}^{\rightarrow}(t)$
        Calculate degree of similarity $d(r\ r_{ref}^{\leftarrow})$ between $r(\alpha_i \times t + \beta_j)$ and $r_{ref}^{\leftarrow}(t)$
        Record movement d with highest degree of similarity and record degree of similarity m at that time
        If d is higher than $d_{opt}$:
            Update ($d_{opt}$, $m_{opt}$) to (d m)
        end If
    end For
end For
If $d_{opt}$ is higher than $d_{th}$:
    Output ($d_{opt}$, $m_{opt}$)
else:
    Classify as undeterminable
end If The case of calculating the degree of similarity $d(r\ r_{ref}^{\downarrow})$ with the above algorithm is described as a representative example. Other degrees of similarity can be calculated in the same way. The degree of similarity is calculated as the distance between the reference signal and the output of the touch sensors 1. In this example, the reference signal and the output of the touch sensors 1 are represented as three-dimensional vectors having three elements, SW1, SW2, and SW3. The controller 12 can calculate the distance between two vectors at each time by matching the time axes and calculating the normal of the difference between the reference signal and the output of the touch sensors 1 at each time. The controller 12 performs the above-described calculation for each time in a predetermined range and calculates the cumulative sum of the normal calculated at each time. The result obtained from the above calculation is based on the distance between the reference signal and the output of the touch sensors 1 and is therefore smaller as the reference signal and the output of the touch sensors 1 are more similar. The controller 12 may subtract the result obtained from the above calculation from a predetermined value and adopt the resulting value as the degree of similarity. The controller 12 may adopt the reciprocal of the result obtained from the above calculation as the degree of similarity. In these cases, the degree of similarity is a larger value as the reference signal and the output of the touch sensors 1 are more similar. The controller 12 may adopt the result obtained is from the above calculation directly as the degree of similarity. In this case, the degree of similarity is defined as being a smaller value as the reference signal and the output of the touch sensors 1 are more similar. As described above, the expression "high degree of similarity" does not necessarily mean that the value of the degree of similarity is large. The degree of similarity can be considered high as the difference between the reference signal and the output of the touch sensors 1 is smaller. The value of the degree of similarity may be increased or decreased as the degree of similarity is higher.

An example algorithm for calculating the degree of similarity is illustrated below.

TABLE 2

Algorithm for calculating degree of similarity $d(r\ r_{ref}^{\downarrow})$

Figure 19:
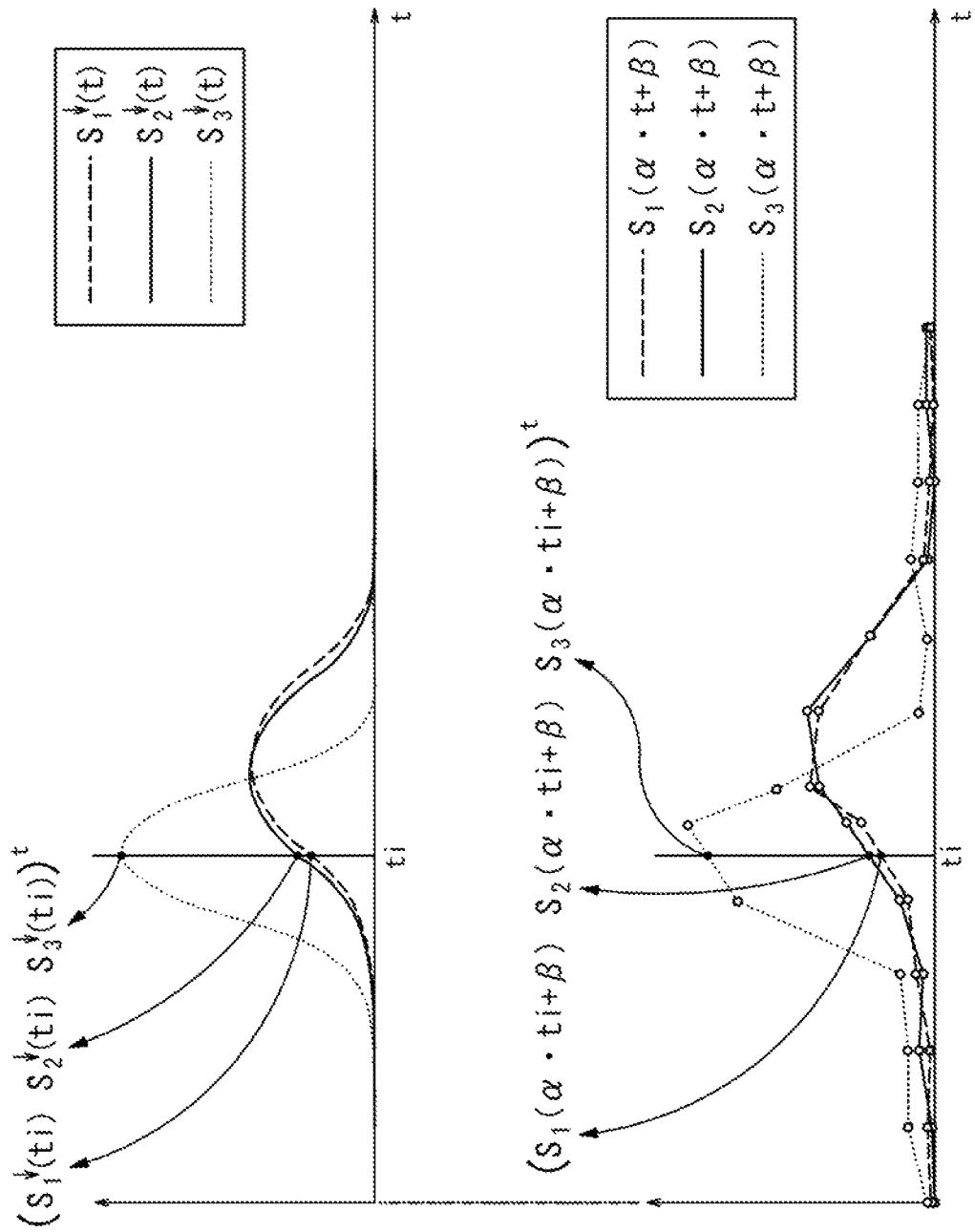
FIG. 19 illustrates a method of calculating the distance between two vectors as a degree of similarity.

Substitute zero into degree of similarity d
For $t_k$ in $(t_1\ t_2\ t_3\ ...\ t_T)$:
    Calculate cumulative sum $d \leftarrow d + \|r(\alpha_i \times t_k + \beta_j) - r_{ref}^{\downarrow}(t_k)\|$
end For
Output calculation result $d(r\ r_{ref}^{\downarrow})$ The method of calculating the degree of similarity is described with reference to FIG. 19, for example. The controller 12 acquires the reference signal and the output of the touch sensors 1 at a certain time $t_i$ and creates three-dimensional vectors. The controller 12 calculates the distance between the two vectors. The controller 12 can calculate the degree of similarity by performing this processing at other times $(t_1, t_2, t_3, \ldots, t_T)$ as well and calculating the sum of all the distances.

The degree of similarity is not limited to the above calculation examples 1 and 2 and may be calculated with various methods.

Although embodiments of the present disclosure have been described through drawings and examples, it is to be noted that various changes and modifications will be apparent to those skilled in the art on the basis of the present disclosure. Therefore, such changes and modifications are to be understood as included within the scope of the present disclosure. For example, the functions or the like included in the various components or steps may be reordered in any logically consistent way. Furthermore, components or steps may be combined into one or divided.

When touch sensors 1 are provided, each touch sensor 1 normally only detects two states, i.e. a finger touching or not touching. Movement by which a contacting object, such as a finger, traces a pattern on the screen can be identified without the need for numerous touch sensors 1 when information detected from three touch sensors 1 is considered to represent a trajectory in three-dimensional space.

The detection apparatus 10 according to the present embodiment uses capacitance-type touch sensors 1 and does not include physical switches on the housing 5 or the cover 2. A major change to the housing 5 is therefore unnecessary when mounting a new touch sensor 1.

In the present embodiment, a configuration with three touch sensors 1 has been described as an example. The number of touch sensors 1 is not limited to three, however. The number may be two, or the number may be four or more. The controller 12 can acquire output from N touch sensors 1 and use the trajectory traced in N-dimensional space to judge the pattern of the slide input.

An example targeting only slide input, i.e. tracing movements, has been described. The output of the touch sensor 1 when the surface of the cover 2 is simply tapped may also be considered as a trajectory. When a trajectory generated by a tap operation is distinguished from a trajectory generated by other operations, the detection method according to the present embodiment can also detect tap operations. When type operations are detected, switches can be configured virtually even at locations where the touch sensors 1 are not disposed. In other words, the detection apparatus 10 may judge whether input of a predetermined pattern, including not only slide input but also tap operations, is provided.

The detection apparatus 10 and the detection method according to the present embodiment enable recognition of a tracing movement by a contacting object such as a finger on a physical body, even if the physical body has a three-dimensional, complex shape such as a spherical shell, as long as a small number of touch sensors 1 are disposed and can detect contact by the contacting object.

The detection apparatus 10 is not limited to the field device 100 and can be used to detect slide input by a contacting object in various other devices.

The invention claimed is:

1. A detection apparatus comprising:
   a cover;
   a plurality of touch sensors configured to output a detection signal based on a contact on the cover; and
   a controller configured to acquire the detection signal;
   wherein the controller is configured to detect the contact on the cover based on the detection signal; and
   wherein the controller is configured to combine the detection signal output over time by each touch sensor from when the contact on the cover starts until the contact on the cover ends to generate a trajectory in a three-dimensional virtual space that has axes corresponding to each touch sensor, and determine whether input of a pattern is provided based on the trajectory.

2. The detection apparatus of claim 1, wherein the pattern includes a slide input.

3. The detection apparatus of claim 1, wherein as a distance from a position where the cover is contacted to each touch sensor is shorter, each touch sensor is configured to output a larger signal as the detection signal.

4. The detection apparatus of claim 2, wherein as a distance from a position where the cover is contacted to each touch sensor is shorter, each touch sensor is configured to output a larger signal as the detection signal.

5. The detection apparatus of claim 1, wherein the trajectory indicates a combination of a magnitude of the detection signal output by each touch sensor over time.

6. The detection apparatus of claim 2, wherein the trajectory indicates a combination of a magnitude of the detection signal output by each touch sensor over time.

7. The detection apparatus of claim 3, wherein the trajectory indicates a combination of a magnitude of the detection signal output by each touch sensor over time.

8. The detection apparatus of claim 5, wherein the controller determines whether the input of the pattern is provided based on a degree of similarity between the trajectory that is detected and a trajectory acquired in advance that corresponds to a predetermined pattern.

9. The detection apparatus of claim 6, wherein the controller determines whether the input of the pattern is provided based on a degree of similarity between the trajectory that is detected and a trajectory acquired in advance that corresponds to a predetermined pattern.

10. The detection apparatus of claim 7, wherein the controller determines whether the input of the pattern is provided based on a degree of similarity between the trajectory that is detected and a trajectory acquired in advance that corresponds to a predetermined pattern.

11. The detection apparatus of claim 1, wherein the controller determines whether the input of the pattern is provided based on a degree of similarity between the trajectory that is detected and a trajectory acquired in advance that corresponds to a predetermined pattern.

12. A detection method comprising:
   acquiring a detection signal based on a contact on a cover from a plurality of touch sensors;
   detecting the contact on the cover based on the detection signal;
   combining the detection signal output over time by each touch sensor from when the contact on the cover starts until the contact on the cover ends to generate a trajectory in a three-dimensional virtual space having axes corresponding to each touch sensor; and determining whether input of a pattern is provided based on the trajectory.

13. The detection method of claim 12, wherein the pattern includes a slide input.

14. The detection method of claim 12, wherein as a distance from a position where the cover is contacted to each touch sensor is shorter, each touch sensor is configured to output a larger signal as the detection signal.

15. The detection method of claim 12, wherein the trajectory indicates a combination of a magnitude of the detection signal output by each touch sensor over time.

16. A non-transitory computer-readable medium storing a detection program that, when executed by a processor, causes the processor to at least:

acquire a detection signal based on a contact on a cover from a plurality of touch sensors;

detect the contact on the cover based on the detection signal;

combine the detection signal output over time by each touch sensor from when the contact on the cover starts until the contact on the cover ends to generate a trajectory in a three-dimensional virtual space having axes corresponding to each touch sensor; and determine whether input of a pattern is provided based on the trajectory.

17. The non-transitory computer-readable medium of claim 16, wherein the pattern includes a slide input.

18. The non-transitory computer-readable medium of claim 16, wherein as a distance from a position where the cover is contacted to each touch sensor is shorter, each touch sensor is configured to output a larger signal as the detection signal.

19. The non-transitory computer-readable medium of claim 16, wherein the trajectory indicates a combination of a magnitude of the detection signal output by each touch sensor over time.

20. The detection apparatus of claim 1, wherein whether the input of the pattern is provided is determined without determining an actual touch location of the contact.

\* \* \* \* \*